United States Patent
Hughes et al.

(10) Patent No.: US 9,881,348 B2
(45) Date of Patent: Jan. 30, 2018

(54) ACTIVATION SYSTEM ARCHITECTURE

(71) Applicant: MICROSOFT TECHNOLOGY LICENSING, LLC, Redmond, WA (US)

(72) Inventors: Aidan T. Hughes, Bellevue, WA (US); Alexander V. Baxter, Kirkland, WA (US); Mark Kenworthy, Duvall, WA (US); Alexander Frank, Bellevue, WA (US); Oliver Szimmetat, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 190 days.

(21) Appl. No.: 14/099,426

(22) Filed: Dec. 6, 2013

(65) Prior Publication Data

US 2014/0095394 A1    Apr. 3, 2014

Related U.S. Application Data

(63) Continuation of application No. 11/821,777, filed on Jun. 25, 2007, now Pat. No. 8,620,818.

(51) Int. Cl.
G06Q 10/00    (2012.01)
G06Q 99/00    (2006.01)
(Continued)

(52) U.S. Cl.
CPC ............ G06Q 99/00 (2013.01); G06Q 30/06 (2013.01); G06Q 50/184 (2013.01); G06Q 2220/18 (2013.01)

(58) Field of Classification Search
None
See application file for complete search history.

(56) References Cited

U.S. PATENT DOCUMENTS 5,138,712 A    8/1992  Corbin
5,592,611 A    1/1997  Midgely et al.
(Continued)

FOREIGN PATENT DOCUMENTS

EP    1455257 A1    9/2004
JP    2003-333025 A    11/2003
(Continued)

OTHER PUBLICATIONS

"Office Action and Search Report Received in Taiwan Patent Application No. 97123380", dated Jan. 10, 2014, Filed Date: Jun. 23, 2008, 11 Pages.
(Continued)

Primary Examiner — John Hayes
Assistant Examiner — Jason Fenstermacher
(74) Attorney, Agent, or Firm — Rainier Patents, P.S.

(57) ABSTRACT

Techniques are described for generating a license for software installed on a device. An entitlement certificate is generated including one or more entitlements describing license characteristics of the software. The one or more entitlements are determined in accordance with first information about the software. The first information includes at least one of a purchase token and package information. A binding certificate in accordance with a binding type for the software is generated. A license in accordance with said binding certificate and said entitlement certificate is generated. The binding certificate identifies an entity to which the license is bound.

22 Claims, 15 Drawing Sheets

(51) Int. Cl.
*G06Q 30/06* (2012.01)
*G06Q 50/18* (2012.01)

(56) References Cited

U.S. PATENT DOCUMENTS

| | | | |
|---|---|---|---|
| 5,790,664 A | 8/1998 | Coley et al. | |
| 5,825,884 A | 10/1998 | Zdepski et al. | |
| 6,134,593 A | 10/2000 | Alexander et al. | |
| 6,169,976 B1 | 1/2001 | Colosso | |
| 6,219,692 B1 | 4/2001 | Stiles | |
| 6,223,209 B1 | 4/2001 | Watson | |
| 6,243,468 B1 | 6/2001 | Pearce et al. | |
| 6,298,373 B1 | 10/2001 | Burns et al. | |
| 6,370,580 B2 | 4/2002 | Kriegsman | |
| 7,020,776 B2 | 3/2006 | Lauter et al. | |
| 7,055,040 B2 | 5/2006 | Klemba et al. | |
| 7,096,365 B1 | 8/2006 | Hamann et al. | |
| 7,318,235 B2 | 1/2008 | Grawrock | |
| 8,620,818 B2 | 12/2013 | Hughes et al. | |
| 8,839,451 B1* | 9/2014 | Lam | G06F 21/10 713/193 |
| 2002/0091644 A1 | 7/2002 | Wong et al. | |
| 2002/0128975 A1 | 9/2002 | Klemba et al. | |
| 2002/0174356 A1* | 11/2002 | Padole | G06F 21/10 726/26 |
| 2003/0138135 A1 | 7/2003 | Chung et al. | |
| 2003/0154387 A1 | 8/2003 | Evans et al. | |
| 2003/0156719 A1* | 8/2003 | Cronce | G06F 21/10 380/256 |
| 2004/0003251 A1* | 1/2004 | Narin | G06F 21/10 713/172 |
| 2004/0003271 A1 | 1/2004 | Bourne et al. | |
| 2004/0039916 A1 | 2/2004 | Aldis et al. | |
| 2004/0059938 A1 | 3/2004 | Hughes et al. | |
| 2004/0098277 A1 | 5/2004 | Atkinson et al. | |
| 2004/0098492 A1 | 5/2004 | Atkinson et al. | |
| 2004/0107368 A1 | 6/2004 | Colvin | |
| 2004/0117318 A1 | 6/2004 | Grawrock | |
| 2004/0117625 A1 | 6/2004 | Grawrock | |
| 2004/0139318 A1 | 7/2004 | Fiala et al. | |
| 2004/0172533 A1 | 9/2004 | DeMello et al. | |
| 2004/0177255 A1 | 9/2004 | Hughes | |
| 2004/0177354 A1 | 9/2004 | Gunyakti et al. | |
| 2004/0255115 A1 | 12/2004 | DeMello et al. | |
| 2005/0005098 A1 | 1/2005 | Michaelis et al. | |
| 2005/0039006 A1 | 2/2005 | Stelling et al. | |
| 2005/0107898 A1 | 5/2005 | Gannon et al. | |
| 2005/0131833 A1 | 6/2005 | Martinelli et al. | |
| 2005/0182731 A1 | 8/2005 | Marjadi et al. | |
| 2005/0210254 A1* | 9/2005 | Gabryjelski | G06F 21/105 713/175 |
| 2006/0041512 A1 | 2/2006 | Stetik | |
| 2006/0064756 A1 | 3/2006 | Ebert | |
| 2006/0080257 A1 | 4/2006 | Vaughan et al. | |
| 2006/0085637 A1* | 4/2006 | Pinkas | G06F 21/31 713/168 |
| 2006/0089912 A1* | 4/2006 | Spagna | G06F 21/10 705/51 |
| 2006/0168443 A1* | 7/2006 | Miller | H04L 12/58 713/156 |
| 2006/0288009 A1 | 12/2006 | Pieper et al. | |
| 2007/0179896 A1 | 8/2007 | Elteto et al. | |
| 2008/0184028 A1* | 7/2008 | Anson | G06F 21/57 713/156 |
| 2008/0189213 A1* | 8/2008 | Blake | G06F 21/10 705/59 |
| 2009/0031141 A1 | 1/2009 | Pearson et al. | |

FOREIGN PATENT DOCUMENTS

| | | |
|---|---|---|
| JP | 2005-215945 A | 8/2005 |
| JP | 2006-031320 A | 2/2006 |
| TW | 200540648 A | 12/2005 |
| TW | 200633465 A | 9/2006 |
| TW | I267753 A | 12/2006 |
| WO | 0101316 A2 | 1/2001 |

OTHER PUBLICATIONS

"FLEXlm End Users Guide," Macrovision Corp., Version 9.2, Jul. 2003, 166 pages.
"How to activate Windows XP," Microsoft, Jul. 14, 2004 version, retrieved at<<http://web.archive.org/web/20041028043333/http://support.microsoft.com/kb/307890>> on Mar. 5, 2009, 3 pages.
"Inside Windows Product Activation," Jul. 2001, retrieved at <<http://www.licenturion.com/xp/fully-licensed-wpa.txt>> on May 18, 2010, Berlin, Germany, 11 pages.
"Product Activation Package: The Most Secure and Customer-Friendly Solution for Controlling Software Piracy," Macrovision Corp., 2004, 2 pages.
"Technical Standard Systems Management: Software License Use Management (XSLM)," Mar. 1999, The Open Group, United Kingdom, 286 pages.
Booch, Grady, "Object-Oriented Analysis and Design With Applications," Second Edition, Benjamin/Cummings Publishing Co., Inc., 1994, front matter, back matter, pp. 54-59, index included, 15 pages.
Derfler, Frank and Les Freed, "How Networks Work" Millennium Edition, Chapter 17, 2000, 9 pages.
Sloman, Morris, Ed., "Network and Distributed Systems Management," Addison-Wesley Publishing Co., University of London, Wokingham, England, 1994, front matter, back matter, chapter 3 (pp. 46-66), index included, 26 pages.
White, Ron, "How Computers Work" Millennium Edition, Chapters 1-9, 1999, Que Corp., 284 pages.
Non-Final Office Action dated May 27, 2010 from U.S. Appl. No. 11/821,777, 27 pages.
Examiner Initiated Summary dated Aug. 13, 2010 form U.S. Appl. No. 11/821,777, 3 pages.
Response filed Sep. 27, 2010 to the Non-Final Office Action dated May 27, 2010 from U.S. Appl. No. 11/821,777, 19 pages.
Examiner Initiated Interview Summary dated Feb. 24, 2011 from U.S. Appl. No. 11/821,777, 3 pages.
International Search Report and Written Opinion dated Feb. 28, 2009 from PCT Patent Application No. PCT/US2008/067973, 13 pages.
International Preliminary Report on Patentability dated Jan. 5, 2010 from PCT Patent Application No. PCT/US2008/067973, 10 pages.
Office Action dated May 13, 2014 from Taiwan Patent Application No. 97123380, 19 pages.
Final Office Action dated Dec. 23, 2010 from U.S. Appl. No. 11/821,777, 25 pages.
Response filed Mar. 7, 2011 to the Final Office Action dated Dec. 23, 2010 from U.S. Appl. No. 11/821,777, 13 pages.
Non-Final Office Action dated May 1, 2013 from U.S. Appl. No. 11/821,777, 21 pages.
Response filed Aug. 22, 2013 to the Non-Final Office Action dated May 1, 2013 from U.S. Appl. No. 11/821,777, 13 pages.
Notice of Allowance dated Sep. 6, 2013 from U.S. Appl. No. 11/821,777, 11 pages.
Notice of Allowance dated Nov. 14, 2013 from U.S. Appl. No. 11/821,777, 6 pages.
Response filed Apr. 9, 2014 to the Office Action dated Jan. 10, 2014 from Taiwan Patent Application No. 97123380, 40 pages.
Response filed Jul. 10, 2014 to the Office Action dated May 13, 2014 from Taiwan Patent Application No. 97123380, 8 pages.
Decision of Patent Examination dated Jan. 9, 2015 from Taiwan Patent Application No. 97123380, 4 pages.
Voluntary Amendment filed Jul. 8, 2010 from China Patent Application No. 200880021792.3, 11 pages.
First Office Action dated Apr. 28, 2011 from China Patent Application No. 200880021792.3, 7 pages.
Response filed Sep. 13, 2011 to the First Office Action dated Apr. 28, 2011 from China Patent Application No. 200880021792.3, 20 pages.

(56) References Cited

OTHER PUBLICATIONS

Second Office Action dated Jan. 30, 2012 from China Patent Application No. 200880021792.3, 7 pages.
Response filed Apr. 1, 2012 to the Second Office Action dated Jan. 30, 2012 from China Patent Application No. 200880021792.3, 21 pages.
Third Office Action dated May 23, 2012 from China Patent Application No. 200880021792.3, 12 pages.
Response filed Jul. 23, 2012 to the Third Office Action dated May 23, 2012 from China Patent Application No. 200880021792.3, 22 pages.
Notice on Grant dated Nov. 16, 2012 from China Patent Application No. 200880021792.3, 9 pages.
Amendment filed Feb. 24, 2010 from European Patent Application No. 08771782.3, 11 pages.
Extended European Search Report dated Apr. 25, 2012 from European Patent Application No. 08771782.3, 6 pages.
Response filed Nov. 22, 2012 to the Extended European Search Report dated Apr. 25, 2012 from European Patent Application No. 08771782.3, 19 pages.
Examination Report dated Jul. 17, 2013 from European Patent Application No. 08771782.3, 5 pages.
Response filed Nov. 27, 2013 to the Examination Report dated Jul. 17, 2013 from European Patent Application No. 08771782.3, 13 pages.
Summons for Oral Proceedings mailed Dec. 23, 2016 from European Patent Application No. 08771782.3, 7 pages.
Anonymous, "Digital signature—Wikipedia", retrieved from <<https://en.wikipedia.org/w/index.php?title=Digital_signature&oldid=128644939>> on Nov. 11, 2016, published May 6, 2007, 12 pages.
Response filed Apr. 12, 2017 to the Summons for Oral Proceedings mailed Dec. 23, 2016 from European Patent Application No. 08771782.3, 23 pages.
Examination Report dated Jul. 14, 2017 from Indian Patent Application No. 08388/DELNP/2009, 5 pages.
Preliminary Opinion dated Jun. 26, 2017 from European Patent Application No. 8771782.3, 3 pages.
Auxiliary Request presented Jun. 29, 2017 from European Patent Application No. 08771782.3, 5 pages.
Decision to Refuse dated Sep. 7, 2017 from European Patent Application 08771782.3, 32 pages.

* cited by examiner

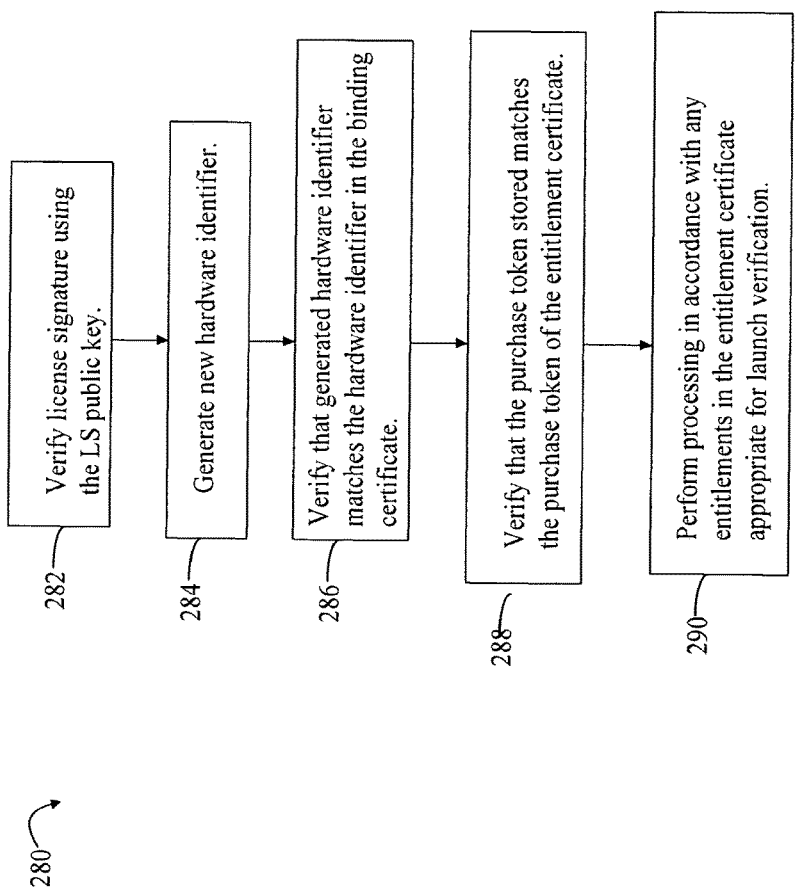

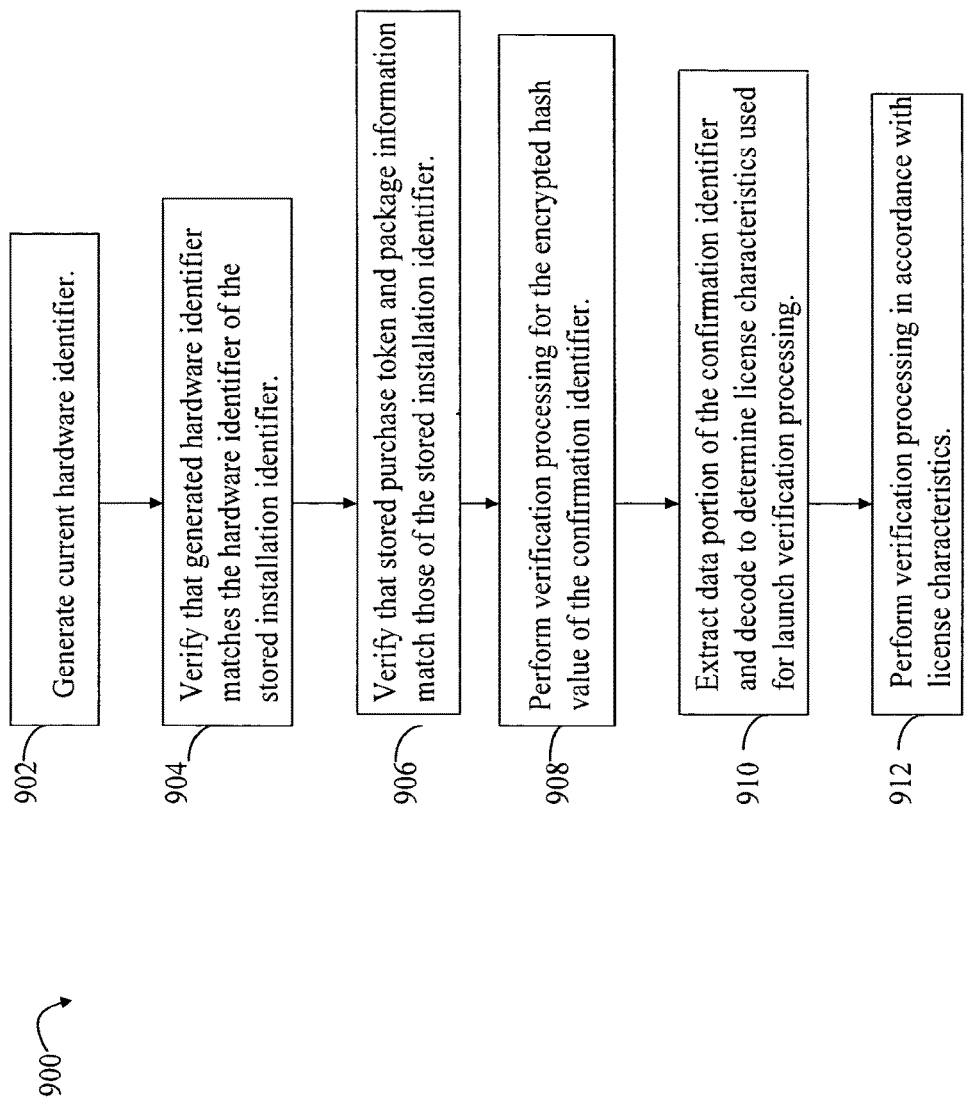

ACTIVATION SYSTEM ARCHITECTURE

CROSS-REFERENCE TO RELATED APPLICATIONS

This patent application is a continuation of, and claims priority from, U.S. patent application Ser. No. 11/821,777 filed on Jun. 25, 2007, which is incorporated herein by reference in its entirety.

BACKGROUND

Computer software may be purchased in various forms, such as on a computer readable medium. A user may then install the software on his/her computer system. The same purchased copy of software may be easily replicated and also installed on multiple machines. The software product vendor may want to control use of each purchased copy of the software product in accordance with the scope of the user's license such as, for example, not allow use of a same purchased copy on more than one computer system. In order to control use of purchased copies of the software product in accordance with a purchaser's license terms, different techniques may be utilized. One existing technique includes requiring activation of the software product after installation in order to use the installed software. For activation purposes, a product key consisting of letters and/or numbers may be included with each purchaser's copy of the software product. A different product key may be included with each purchaser's copy of the software product. After the software is installed on a computer by a user, a hardware identifier is generated. The hardware identifier may be characterized as a "fingerprint" of the user's computer on which the software has been installed. The hardware identifier may be produced using multiple hardware attributes of the user's computer. As part of the activation process, the user registers the hardware identifier with the product key. The hardware identifier is associated with the product key and may be used to track and control subsequent activations of the same purchased copy. For example, a same purchased copy of software may be installed on two computer systems each having a different hardware identifier. Activation may be completed for a first of the computer systems having a first hardware identifier. The user may attempt to activate the software for use on the second computer system. If the license terms only allow the purchased copy of the software to be activated on a single computer system, the activation process for the second computer may fail. As part of activating the software on the second computer, it is determined that the software having the product key is already activated on the first computer having the first hardware identifier.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are described herein for activating software for licensing purposes. An entitlement certificate is generated including one or more entitlements describing license characteristics of the software. The one or more entitlements are determined in accordance with first information about the software. A binding certificate in accordance with a binding type included in the one or more entitlements for the software is generated. The binding certificate identifies an entity to which the license is bound. A license in accordance with the binding certificate and the entitlement certificate is generated.

DESCRIPTION OF THE DRAWINGS

Features and advantages of the present invention will become more apparent from the following detailed description of exemplary embodiments thereof taken in conjunction with the accompanying drawings in which:

FIG. 6 is a flowchart of processing steps that may be performed in connection with launching software on a device having a license stored thereon;

FIG. 13 is a flowchart of processing steps that may be performed in connection with launching software on a device using information associated with having previously performed offline activation processing.

DETAILED DESCRIPTION

Figure 1:
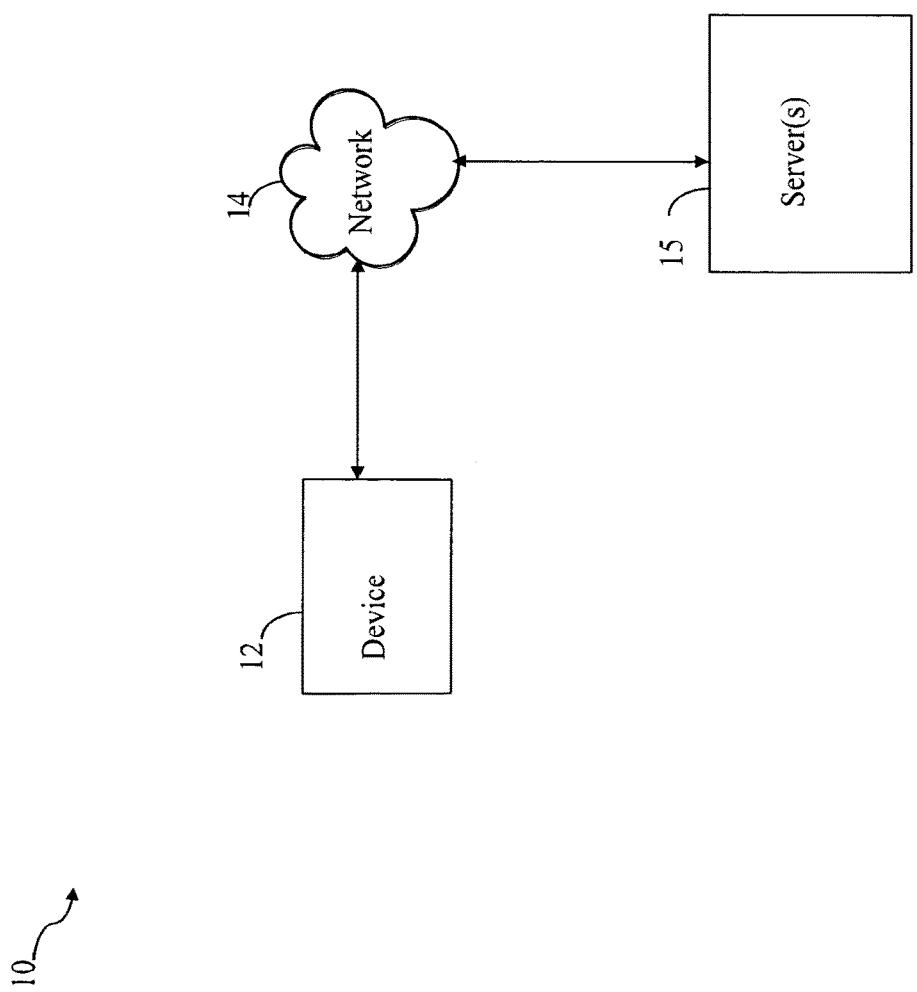
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein in connection with enabling software products to be activated for licensing purposes. The techniques herein may utilize an entitlement service, an optional binding service and a license service to establish the rights associated with the software package installed by a user and the identity to which any issued license is required to be bound. In connection with an online activation mode, the license service may issue a license which is verified each time the software for which the license was issued is invoked. In connection with an offline activation mode, the user may be provided with a confirmation identifier used in connection with other information for verification each time the software for which the license was issued is invoked.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, wireless devices such as cellular phones, PDAs, minicomputers, mainframe computers, distributed computing environments that include any of the above systems or devices, and the like.

Included in FIG. 1 are a device 12, a network 14, and a server 15. The device 12 may be, for example, a computer, such as a personal computer, having a display output device and an input device providing for interactive I/O with a user thereof. In following paragraphs, additional details are provided with respect to the device 12. However, the same details may also apply to one or more other devices that may be connected to the network 14 in an embodiment. Although the example 10 of FIG. 1 includes only a single device and a single server, an embodiment utilizing the techniques herein may include any number of devices and other components.

The device 12 included in FIG. 1 is exemplary for purposes of illustrating the techniques described herein in connection with software components. In one embodiment, any device 12 providing the functionality described herein may be included in an embodiment. The device 12 may include a processor used to execute code included in one or more program modules. Described in more detail elsewhere herein are program modules that may be executed by the device 12 in connection with the techniques described herein.

The device 12 may operate in a networked environment and communicate with the server 15 and other computers or components not shown in FIG. 1. As described herein, the device 12 may be a personal computer. In other embodiments, the functionality of device 12, or the device 12 itself, may be included in another component in accordance with a particular environment in which the device 12 is utilized. As will be described in following paragraphs in more detail, software may be installed on the device 12 which needs to be activated prior to use. The techniques herein may be used to activate the installed software on the device 12.

In connection with the online activation mode described in more detail in following paragraphs, the device 12 may communicate with one or more services of the server 15 for activating the software installed on device 12. The online activation mode is one way in which installed software may be activated for use when the device 12 has connectivity to one or more servers providing services for product activation.

It will be appreciated by those skilled in the art that although the device 12 is shown in the example as communicating in a networked environment, the device 12 may communicate with other components utilizing different communication mediums. For example, the device 12 may communicate with one or more components utilizing a network connection, and/or other type of link known in the art including, but not limited to, the Internet, an intranet, or other wireless and/or hardwired connection(s) to the server 15 and/or other components.

It should be noted that although the device 12 is illustrated as having network connectivity to the server 15, the techniques described herein may be used in connection with a device directly connected to the server 15 without a network. Furthermore, it should also be noted that the device 12 may also operate in a standalone mode with no connectivity to a server. In such instances, software installed on the device 12 may be activated using an offline activation mode also described in more detail in following paragraphs.

Figure 2:
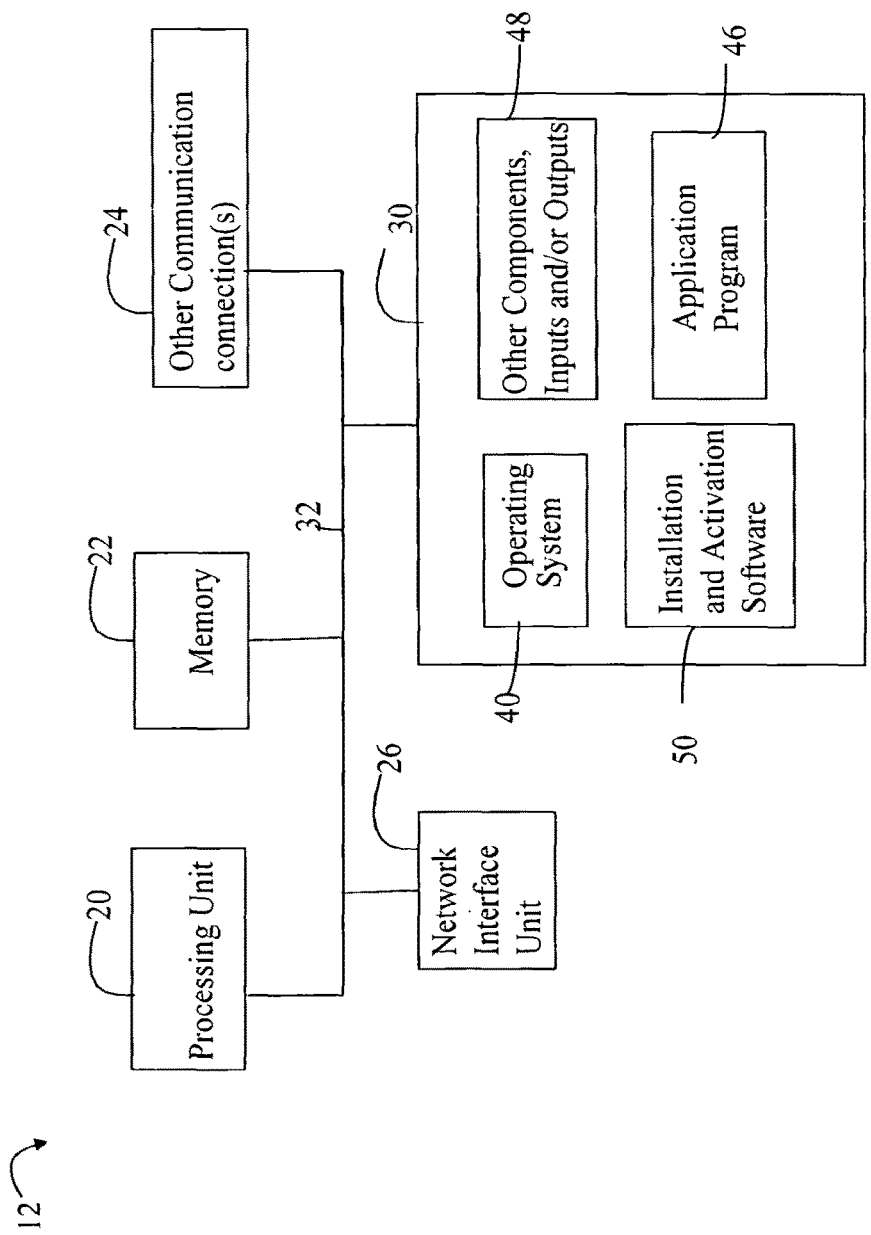
FIG. 2 is an example of an embodiment of components that may comprise a device of FIG. 1.

Referring now to FIG. 2, shown is an example of components that may be included in the device 12 as may be used in connection with performing the various embodiments of the techniques described herein. The device 12 may include one or more processing units 20, memory 22, a network interface unit 26, storage 30, one or more other communication connections 24, and a system bus 32 used to facilitate communications between the components of the device 12.

Depending on the configuration and type of user device 12, memory 22 may be volatile (such as RAM), non-volatile (such as ROM, flash memory, etc.) or some combination of the two. Additionally, the device 12 may also have additional features/functionality. For example, the device 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the device 12. The storage 30 in one embodiment may be a mass-storage device with associated computer-readable media providing non-volatile storage for the device 12. Although the description of computer-readable media as illustrated in this example may refer to a mass storage device, such as a hard disk or CD-ROM drive, it will be appreciated by those skilled in the art that the computer-readable media may be any available media that can be accessed by the device 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by device 12.

The device 12 may also contain communications connection(s) 24 that allow the computer to communicate with other devices and components such as, by way of example, input devices and output devices. These and other devices are well known in the art and need not be discussed at length here.

In one embodiment, the device 12 may operate in a networked environment as illustrated in FIG. 1 using logical connections to remote computers through a network. The device 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the device 12, one or more of these elements included in the storage 30 may also reside in a portion of memory 22, such as, for example, RAM for controlling the operation of the user computer 12. The example of FIG. 2 illustrates various components including an operating system 40, one or more application programs 46, installation and activation software 50, and other components, inputs, and/or outputs 48.

The application program 46 may be software installed by a user on the device 12. Once the application program 46 has been installed, it may be activated in order to enable the application program to execute. As a result of the activation process, verification data is obtained for use in connection with verifying that subsequent attempts to launch the program are in compliance with licensing terms. The verification data used may vary with the particular activation mode. In one embodiment, the activation process may be performed using one of two different activation modes, the online activation mode and the offline activation mode mentioned briefly above and described in more detail below. Each mode may result in different verification data for use on the device 12. The online activation mode may be used when the device 12 has connectivity to the server 15. The verification data generated as a result of the online activation mode may include a license in an electronic form. The license may be generated by the server 15 and communicated to the device 12. The license may be stored on the device 12 and used in connection with each subsequent launch of the application program. In connection with an offline activation mode, the device 12 does not obtain verification data over a connection to the server 15. In connection with the offline activation mode, the device 12 may not be connected to any network and may be operating standalone. The verification data may include information obtained through other communication means such as, for example, over the phone with a user communicating with a Customer Service Representative (CSR) or Interactive Voice Recognition (IVR) system. This verification data obtained as a result of the offline mode activation process may include a confirmation identifier obtained over the phone or alternative communication medium besides a computer network. The verification data may be entered, such as by manual data entry on the device 12, and stored for subsequent use on the device 12 when launching the application program 46.

The device 12 also includes installation and activation software 50 used in connection with installing and activating the software in accordance with techniques herein. The component 50 may also include software used in connection with each program launch or invocation. Each time program 46 is invoked, the component 50 may perform verification processing to ensure compliance with the license or other verification data previously obtained in accordance with the particular activation mode used.

The operating system 40 may be any one of a variety of commercially available or proprietary operating systems. The operating system 40, for example, may be loaded into memory in connection with controlling operation of the device 12.

It should be noted that the server 15 of FIG. 1 may include one or more computers with components similar to those described in connection with FIG. 2. The different services or modules that may be included in the server 15 for use with the activation techniques herein are described in more detail in following paragraphs.

Figure 3:
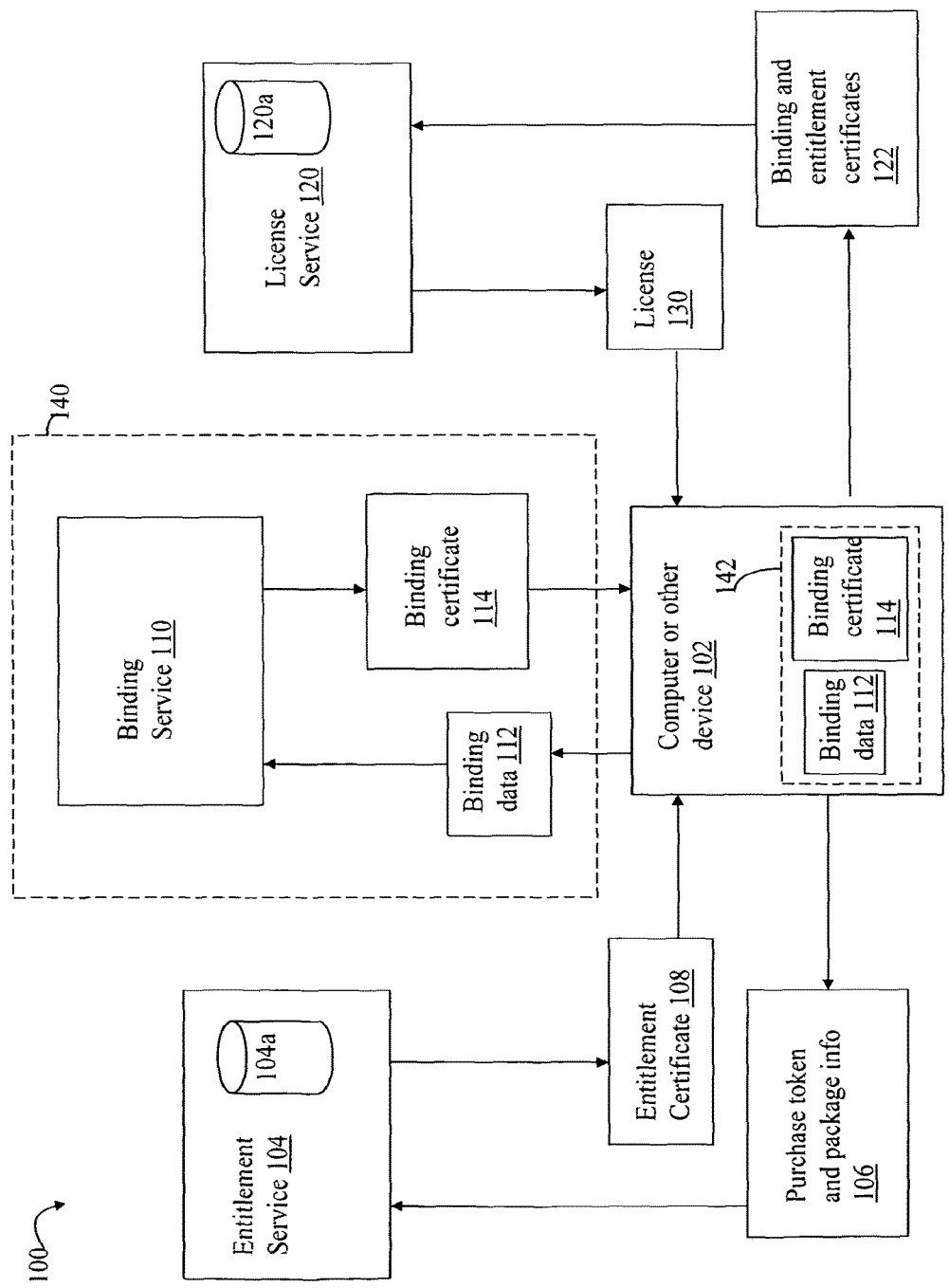
FIG. 3 is an example of an embodiment of components that may be used in connection with online activation processing.

Referring now to FIG. 3, shown is an example of components that may be used in connection with the activation techniques herein for the online activation mode. As described above, the online activation mode provides for activation of installed software on the computer 102 when the computer 102 is connected to the server 15. Included in FIG. 3 are an entitlement service (ES) 104, a binding service (BS) 110, and a license service (LS) 120. In one embodiment, all of the components 104, 110 and 120 may be included on a single server. Alternatively, it will be appreciated by those skilled in the art that one or more of the services 104, 110 and 120 may be located on different servers in communication with the computer 102.

The activation process may be commenced after installation of the software on the computer or other device 102. As part of the installation dialogue, the user may be prompted as to whether to perform activation processing. In an embodiment providing multiple activation modes, the user may also be prompted to select one of the possible activation modes, such as the online activation mode. Upon selection of the online activation mode, the computer 102 may commence processing for the online activation process that will now be described. In connection with performing the online activation process, the computer 102 may contact each service 104, 110 and 120 on the server. Information regarding the server address, such as an Internet address, and other data needed to connect to connect to the server and appropriate services may be included in, or otherwise communicated to the component 50. The component 50 may be located on the computer 102 as a result of installation of the software for which activation is being performed. A location, such as an Internet address, for each of the ES, BS and/or LS may be included with the component 50. Such information may be incorporated into a data file or coded portion of software for the component 50. As also described in following paragraphs, a location of one or more of the services may be communicated using other means. For example, the ES may provide an Internet address of the LS to be used.

The computer 102 may contact the ES 104. The computer 102 may send to the ES 104 a purchase token and package information 106 and receive an entitlement certificate (EC) 108. The purchase token and package information may be stored on the computer 102 for use in connection with subsequent processing when launching the application program or other software for which activation processing is being performed.

The ES 104 determines, based on the purchase token and package information 106, what rights or entitlements are associated with the installed software on the computer 102. The purchase token may be a product key received with the purchased copy of the software installed on the computer 102 for which activation is being performed. The purchase token may be a string of alphanumeric and/or other characters used to distinguish or differentiate between different purchased copies of a same software product. Each purchased copy of the software product, such as a word processor, may include the same software for installation on a computer. The purchase token may be used to differentiate between these purchased copies. The purchase token may be provided, for example, on a label or with other papers included with the purchased software. The user may be prompted to enter the purchase token as part of the installation dialogue prior to activation. For example, a purchase token may be the information included on a shrink-wrap package of the software product. The purchase token may include a 5-bit product code, a 3 bit site value indicating a place of manufacture for the software product, and a 7 bit serialized number that is incremented with each instance of the product manufactured. The package information may be information identifying the software product such as, for example, a string of alphanumeric and/or other characters identifying the software product by a name to distinguish this software product from possibly other software products. The package information may be provided by the installation software for use in connection with activation. Alternatively, the user may be prompted prior to activation to enter package information as may be included with the purchase token of the software product.

Based on the purchase token and package information 106, the ES 104 determines the rights or entitlements for the installed software on the computer 102. The ES 104 may use the purchase token and package information 106 to index into an entitlements database 104a to obtain corresponding entitlements. The entitlements indicate the attributes of the license or license characteristics such as the license terms and conditions and other aspects related to the terms and conditions of the license. For example, the entitlements use attributes to describe various terms and conditions of the license such as license expiration date and/or start date and how many computers can execute the same software copy, as well as related aspects such as the type of license and type of binding. Each of the foregoing types of entitlements, and others are described in more detail in following paragraphs.

Figure 3A:
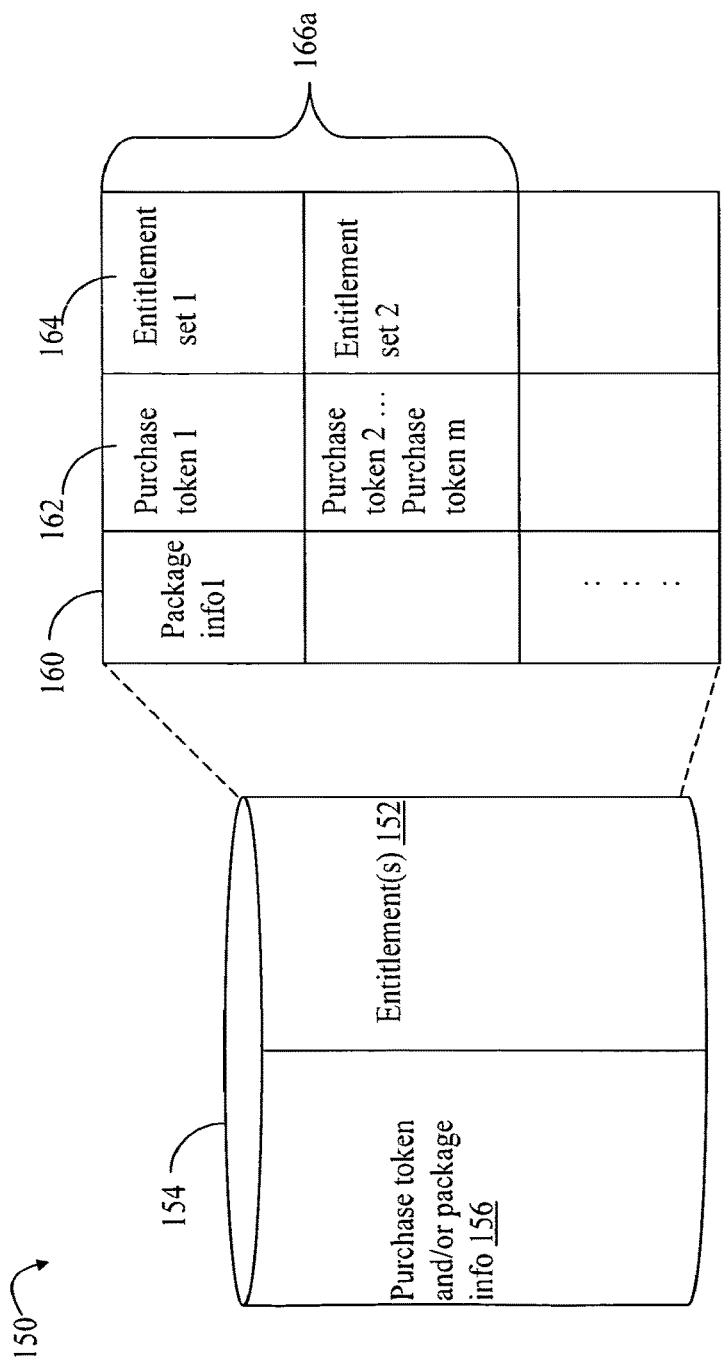
FIG. 3A is an example representation of an entitlements database.

Referring to FIG. 3A, shown is an example representation of the entitlements database. The example 150 illustrates how the purchase token and/or package information 156 may be used to index into the database 154 to obtain the corresponding one or more entitlements 152. As a further illustration, the database may use as a first index the package information included in column 160. The database may be logically organized so that entitlements for each product are grouped together as illustrated by 166a. In this example, each product having a first set of package information, package info 1, is included in 166a. Each product may have a range of one or more associated purchase tokens for which a set of one or more entitlements may be included in the database. For example, package info 1 may have a first set of entitlements, entitlement set 1, included in column 164 for a first purchase token, purchase token 1, of column 162. The purchase token 1 may be used as a secondary index into the entitlements database to obtain the entitlement set 1. The database 154 may also specify a range of purchase tokens in column 162 for which a set of entitlements are retrieved. For example, if the purchase token is within the range designated by "Purchase token 2 . Purchase token m", a second set of entitlements, entitlement set 2 of column 164, may be used.

The entitlements may indicate the type of license. Examples of different license types may include, but are not limited to, perpetual, trial-based license, subscription, and per use or number of uses license. The trial-based license may be a license for a defined time period such as 30 days. The subscription license may also be a time-based license for a defined time period or duration. With a subscription license, the user may be given/prompted with a chance to renew the license in connection with processing steps performed at application launch or invocation time. A number of uses license indicates a number of times that the software product may be launched or invoked for execution.

The entitlements may indicate an overall license expiration date so that regardless of the type of license, the license may expire on a certain date. For example, the software may be a field test version and may not be used after a particular date regardless of when the licensing period commenced. As another example, the software product may be an electronic encyclopedia or other item containing dated information so that the license may expire at a definite date at which the information is deemed to be outdated. The entitlements may also indicate a start or beginning date, for example, for software that only may be used from a particular starting date.

The entitlements may indicate how many computer systems the software may be activated upon. For example, shrink-wrapped software may be a single user license so that each copy of the installed software may only be activated on one computer. As will be described in connection with the license server 120, such attributes may be used so that subsequent attempts to activate the same software copy on a different computer will fail. It should be noted that this entitlement may also be characterized as indicating the number of activation bindings possible. As described in more detail elsewhere herein, an activation binding is when a license is bound to an instance of a binding entity in connection with the activation of a software product.

The entitlements may indicate what one or more types of binding may be used. In connection with the activation service, the license generated for a purchase token is bound to a particular binding type instance. The entitlements may indicate the type or types of binding to which the license may be bound. In one embodiment, different possible binding types that may indicated include a hardware identifier, user authentication information, a USB key identifier, and a trusted platform module (TPM). A different license may be issued for an activation binding which is then bound for a particular instance of a binding type.

An instance of the hardware identifier binding type may be a hardware identifier describing the hardware of a computer having installed software thereon for which activation processing is being performed. The hardware identifier may be characterized as a hardware "fingerprint" of a computer based on the particular hardware of the computer or other device upon which the software is installed. The hardware identifier may be a multi-bit value. Each grouping of one or more bits of the multi-bit value may be determined from a different hardware component of the computer or other device. For example, one or more bits in the hardware identifier may be derived from a global address of a network card of the computer. Other bits in the hardware identifier may be derived from other hardware components such as, for example, the serial number of the hard drive, the number of bytes of RAM, and the like. Generating a hardware identifier is described in more detail, for example, in U.S. Pat. No. 6,243,468, Jun. 5, 2001, Pearce et al., SOFTWARE ANTI-PIRACY SYSTEM THAT ADAPTS TO HARDWARE UPGRADES. An embodiment may also use other techniques such as described, for example, in U.S. Publication No. 2004/0177354, published Sep. 9, 2004, Gunyakti et al, COMPACT HARDWARE IDENTIFICATION FOR BINDING A SOFTWARE PACKAGE TO A COMPUTER SYSTEM HAVING TOLERANCE FOR HARDWARE CHANGES (U.S. patent application Ser. No. 10/378,294, filed Mar. 3, 2003). The size of the hardware identifier may vary in an embodiment. For example, an embodiment may use a hardware identifier which is 32 bits or larger.

The hardware identifier is meant to identify a particular computer system and distinguish one computer system from another as needed to limit software piracy. A different hardware identifier suggests that the underlying hardware components upon which the identifier is based differ in some manner as may be the case with different computer systems. In such cases, attempting to bind a license based on a purchase token to one hardware identifier when an existing license based on the same purchase token is already bound to another hardware identifier may be detected and disallowed for a single computer system license using the activation techniques herein as described in connection with the license service. However, it may also be the case that a same computer system's hardware identifier has changed due to changes in hardware configuration of the same computer system. For example, installing a new hard drive may change the hardware identifier of the computer. An embodiment may also utilize a level of tolerance in connection with determining whether two hardware identifiers identify the same computer system. The tolerance may account for a degree of allowable differences between hardware identifiers of a same computer system generated at different points in time, for example, as may occur due to hardware upgrades or replacements. For example, in an embodiment having a multi-bit hardware identifier, the tolerance may allow for a difference of one or more bits in two hardware identifiers and the two hardware identifiers may be deemed to still identify the same computer system. An embodiment may use different levels of tolerances and techniques in connection with generating hardware identifiers and determining whether two hardware identifiers refer to the same computer system for purposes of binding with a license. The foregoing U.S. Pat. No. 6,243,468, and U.S. Publication No. 2004/0177354 describe different tolerance levels and techniques used in determining whether two hardware identifiers refer to a same computer system. In connection with a hardware identifier binding type, the license is bound to the hardware identifier, and thus the corresponding computer system for the hardware identifier, as a result of the activation process. The computer 102 may include software thereon capable of generating a hardware identifier in accordance with the particular hardware identifier technique used in an embodiment.

An embodiment may also allow other types of bindings such as binding a license to user authentication information. User authentication information may include, for example, a user login name/identifier and password, and the like. With such a license binding type, a single user license allows execution of the software installed on different computers as long the software execution is associated with the user authentication information specified in the binding. For example, software product 1 may be installed on 10 computers. Software product 1 may have a single user license for which activation is performed resulting in the generation of a license which is bound to account information for User 1. User 1 may log on to any one of the 10 computers with User 1 account and credentials and execute software product 1.

Another type of binding may be based on an identifier associated with a portable secure identification device such as a dongle, a USB device, a smart card, and the like. A dongle as known in the art is a physical device attached to an I/O port such as a USB port, serial port or a parallel port. In connection with a portable secure identification device binding type, the binding is made to the portable secure identification device. In connection with a USB key identifier associated with a USB device, a single user license allows execution of software based on whether there is a USB device plugged in with the USB key identifier specified in the binding instance. As such, the same software of a single user license may be installed on multiple computer systems. Execution of the software on each of the computer systems is allowed as long as the USB key identifier indicated in the binding is inserted into the computer system. As known in the art, a USB key identifier may be associated with each USB device and may be assigned by each particular USB vendor. It will be appreciated by those skilled in the art that the binding type for a USB device and associated USB identifier may also be used in connection with other portable, non-volatile, memory devices and should not be construed to apply to just USB devices as illustrated herein for exemplary purposes. In following paragraphs, reference is made to the USB key identifier as an example of a portable secure identification device. However, this particular type of portable secure identification device is mentioned for purposes of illustration of the techniques herein. It will be appreciated by those skilled in the art that any other type of portable secure identification device may be utilized.

Another type of binding may be based on a trusted platform module (TPM). As known in the art, a TPM is a microchip designed to provide some basic security-related functions to the software utilizing it. The TPM chip may be installed, for example, on the motherboard of a PC or laptop, and communicates with the rest of the system via a hardware bus. The TPM has a master key stored within the TPM itself which is never exposed. Systems that incorporate a TPM have the ability to create cryptographic keys using the master key as well as performing encryption and decryption in connection with the master key, and keys generated therefrom. Use of the master key, or key generated therefrom, in connection with binding is described elsewhere herein to create a license bound to a particular TPM. With the TPM binding type, software activated from a computer system having a TPM module is allowed to execute on the computer system having the TPM module.

The entitlements may also indicate what additional information, if any, is required to receive a license. For example, a user may be required to provide a name, address, phone number, and the like. The foregoing entitlements may be customized for different requirements for license activation that may vary with product, vendor, and the like. For example, if a user is required to provide name and address information, this information may be acquired prior to activation and sent to the ES 104 as additional data besides the package information and the purchase token. If the additional information including the name and address information is provided, then the ES returns the entitlement certificate 108. Otherwise, an error is detected and the activation process may terminate with an appropriate error message displayed on an output device of the computer 102. The ES 104 may check to see that all needed information is supplied. This additional information may be stored, for example, in a database of the server for use by the vendor. Rather than terminate the activation process with an error message if the additional information is not supplied, the ES 104 may identify the deficiency in information supplied, for example, the address information may be incomplete or missing. The ES 104 may issue a request for the missing information from the computer 102 and give the user thereon another chance to supply the missing information and obtain the entitlement certificate (EC) 108.

The entitlements, along with possibly other information, may be returned to the computer 102 in the EC 108. The EC 108 may be a digitally signed document, such as a digitally signed XML document, including the package information, the purchase token and the entitlement information for the purchase token and package information 106 received by the ES 104 from the computer 102. The entitlement information may indicate, for example, that the license is a perpetual license for use on a single computer system with a hardware identifier binding. The EC 108 is certified expression of the licensing rights or entitlements. As described above, the ES 108 may store in an entitlements database the entitlements for a particular combination of package information and/or purchase token. The database may be indexed to return entitlement information based on package information and/or purchase token. For example, for package information identifying a word processing product, the entitlement information may indicate one or more types of licenses, one or more binding types including a hardware identifier binding, and the like. For the word processing product, a predetermined range of purchase tokens may be associated with trial subscriptions. If the purchase token received is included in the predetermined range, entitlement information may be returned to indicate the trial subscription license, beginning and ending dates, and the like. If the purchase token is not within the predetermined range, the license type may be indicated as perpetual rather than a trial license. In connection with the EC, the EC 108 may be signed by the ES 104 using a private key of the ES 104.

In one embodiment, a first portion of information included in the EC 108 may be used by both the computer 102 and the LS 120. A second portion of the information included in the EC 108 may be used by just the LS 120. As an example that will be illustrated in more detail below, the computer 102 may read entitlement information related to a required binding type like a hardware identifier binding type. The computer 102 may generate the binding certificate for the hardware identifier binding type without using a BS 110. As such, the computer 102 may read the binding type included in the EC to see if the computer 102 should generate the binding certificate or otherwise communicate with the appropriate binding service.

Figure 4:
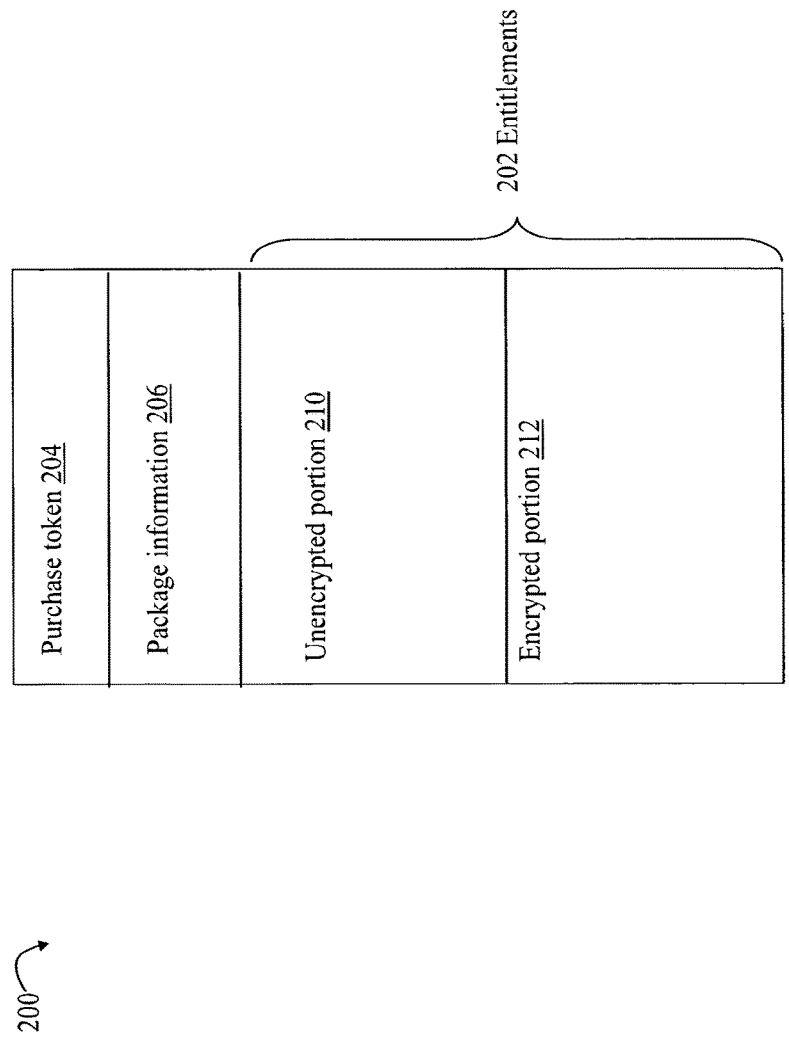
FIG. 4 is an example of information that may be included in an entitlement certificate.

Referring now to FIG. 4, shown is an example representation of an EC 108. The example 200 includes a purchase token 204, package information 206 and entitlements 202. The entitlements 202 may include an unencrypted portion 210 and an encrypted portion 212. The unencrypted portion 210 may be in a human-readable form, such as plain text. The unencrypted portion may be used by the computer 102 as well as the LS 120. The encrypted portion 212 may be used only by the LS 120. Information included in the unencrypted portion may include the hardware binding type, type of license, date information, number of uses for a use license, number of computers the purchase token is entitled to be activated for, the number of times a single computer may reactivate or repeatedly perform activation for a same license, and the like. As described elsewhere herein, the unencrypted information may be used by the computer 102 as part of the activation process and also after activation is complete in connection with subsequent program launches or invocations. As described above the computer 102 may examine the binding type included in portion 210. As another example in which the information in 210 is used by the computer 102, a URL or other address information for the LS 120, BS 110, and the like may be supplied as part of the EC 108. As such, the ES 104 may indicate, using the EC 108, different provider sites for the BS and/or LS for different software products. The EC 108 may also be used to indicate other items which are customized for use in a particular embodiment.

In one embodiment in which the EC 108 is an XML document, each entitlement may be represented as an XML attribute. For example, a license type of SUBSCRIPTION, a hardware identifier (denoted HWDID) binding, and a license service URL may be indicated as:

```
<License>SUBSCRIPTION </License>
<Binding>HWDID</Binding>
<LicenseServiceURL> HTTPS://license.microsoft.com/
</LicenseServiceURL>
```

It should be noted that the encrypted portion 212 may be encrypted with the public key of the expected consumer or user of the information in 212. In this example, the consumer of the information in 212 may be the LS 120. As such, the ES may encrypt the information in 212 using the LS's public key which can be decrypted by the LS using the LS's private key. In this way, only the LS 120 can decrypt and read portion 212. Portion 212 may include information regarding issuance of a license. For example, portion 212 may indicate to issue a free license every so many days for a particular software product and purchase token.

Referring back to FIG. 3, once the computer 102 receives the EC 108, processing for generating a binding certificate may be performed. As described above, the EC 108 includes the binding type information which is used by the computer system 102. Prior to utilizing information included in the EC 104, the computer 102 may verify the authenticity of the EC 108 using the public key of the ES 104. For example, the ES 104 may use any one of a variety of different hashing algorithm to generate a hash value for the EC 108 based on data included therein. The ES 104 may then encrypt the hash value using the ES's private key and include the encrypted hash value as the ES's digital signature. Upon arrival of the EC 108 at the computer 102, the computer 102 may generate a first hash value based on the EC using the same hashing technique as the ES 104. The computer 102 may also decrypt the digital signature (the encrypted hash value) using the ES's public key and compare the decrypted digital signature to the computed first hash value. If the values are the same, then the EC verification is successful. The foregoing is an example of how verification of a digitally signed document may be performed by this and other services in connection with verifying a received digitally signed certificate.

After successfully verifying the EC 104, the computer 102 examines the binding type included in the EC 104 to determine if the binding type is for a hardware identifier. If so, the computer 102 may generate the binding certificate (BC) 114 locally as indicated by element 142. Otherwise, an external BS 110 may be used in generating the BC 114 as indicated by element 140. If the binding type is hardware identifier, the computer 102 may generate a BC including the hardware identifier or hardware "fingerprint" of the computer 102. The BC may then be digitally signed using a private key of the computer 102. The private key of the computer 102 may be included as part of the installation process and stored in a known location on the computer 102.

If the binding type is of another type or than hardware identifier, the appropriate external BS 110 is utilized. The binding data 112 as well as the BS may vary with the type of binding. For example, with a TPM binding, a TPM BS may be used. The public key certificate for the TPM of the computer 102 may be obtained and sent to the BS 110 for certification. As known in the art, this certification may be performed by a certificate authority (CA) to attest that the public key contained in the certificate belongs to the TPM entity noted in the certificate. If the BS successfully certifies the TPM's public key certificate, the BS 110 responds by sending a random number to the computer 102 that is encrypted using the TPM's public key. The computer 102 having the TPM module therein decrypts the random number using the TPM's private key. The computer then sends to the BS 110 the encrypted value received from the BS along with the decrypted random number. The BS 110 responds with a BC 114 that is digitally signed using the private key of the BS. The BC 114 includes the random number encrypted with the TPM's public key, and an unencrypted readable form of the random number. It should be noted that the encrypting may use any encryption technique known in the art such as, for example, AES (Advanced Encryption Standard), Triple DES (Data Encryption Standard), RC4 (or ARCFOUR), and the like.

In connection with other possible binding types, the BC may include appropriate information for the binding type instance and the corresponding BS may perform certification of the binding instance. For example, for a USB or other portable secure device identifier binding type, the BS may certify the USB or other identifier for the binding and generate a BC that is digitally signed by the BS and includes the USB or other identifier associated with the portable secure device. For a user authentication binding type, the BS may certify the user authentication information and generate a BC that is digitally signed by the BS and includes the user authentication information. It should be noted that if the BC includes confidential or sensitive information, such as may be the case with portions of user authentication information, such information may be encoded, encrypted, and the like. For user authentication, the user domain and login name may be stored, or other security identifier (SID) of the operating system for the user.

Once the computer 102 has the BC 114, the computer 102 sends the binding and entitlement certificates (EC and BC) 122 to the LS 120.

Figure 5:
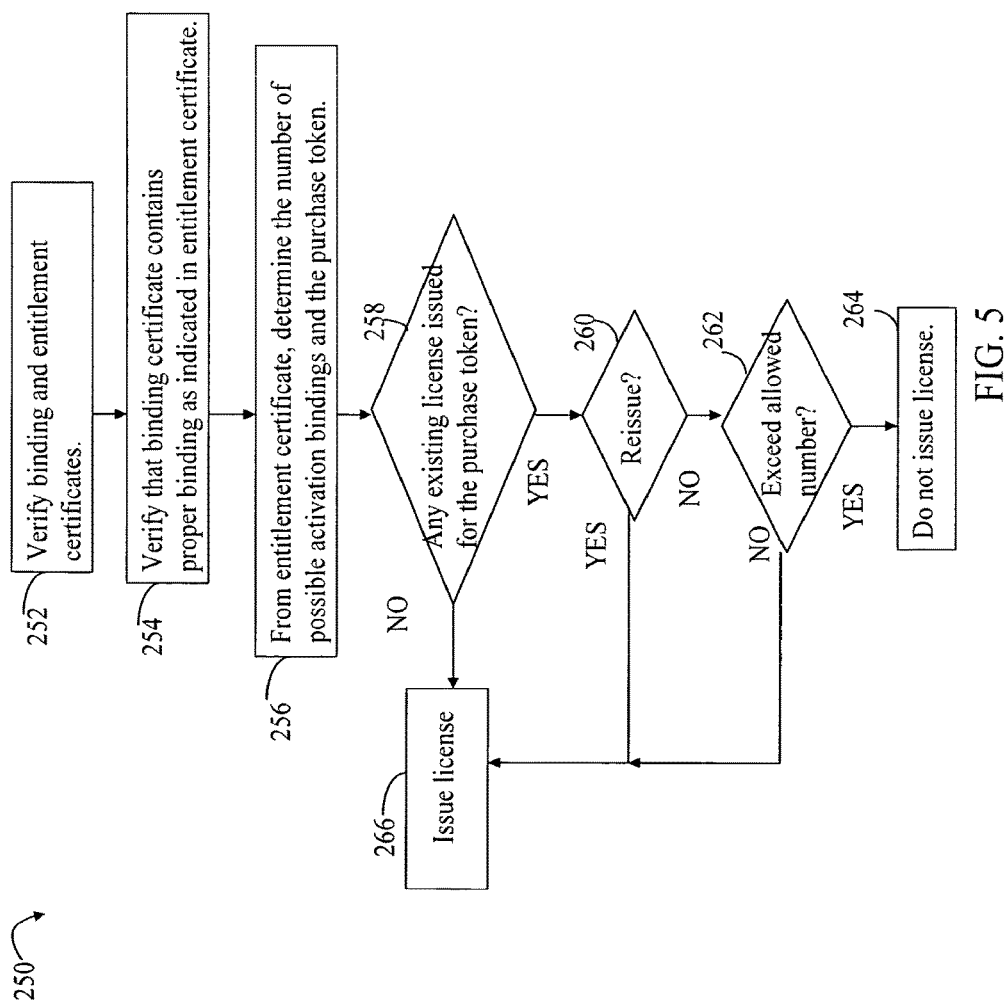
FIG. 5 is a flowchart of processing steps that may be performed by a licensing service in connection with online activation processing.

Referring to FIG. 5, shown is a flowchart of processing steps that may be performed by the LS 120 in connection with online activation processing. At step 252, the LS 120 verifies the EC and BC using, respectively, the public keys of the ES 104 and BS 110. In the case of a hardware identifier binding type, the BS 110 is actually the computer 102 so the computer 102's public key is accordingly used for verification of the BC by the LS 120. Otherwise, the public key of the appropriate external BS is used for verification of the BC. The ES's public key may be used for verification of the EC. After both the BC and EC 122 have been successfully verified, the LS 120 retrieves the binding type information from the EC and determines whether the BC contains the proper binding type as indicated in the BC in step 254. If not, the activation process may terminate with an error condition and message to the computer 102. In step 256, the number of possible activation bindings and the purchase token are obtained from the EC. In connection with a hardware identifier binding type, the number of possible activation bindings may be the number of computer systems for which licenses may be issued. At step 258, a determination is made as to whether there have been any existing licenses issued for the purchase token. In one embodiment, a database 120a of the LS 120 may be queried to determine the number of existing licenses already in the database for the purchase token obtained in step 256 from the EC. If step 258 evaluates to no, control proceeds to step 266 to issue a new license. Information regarding the new license issued is recorded in a database 120a of the LS 120 for use in connection with other processing steps described herein. The license information recorded includes information regarding each binding instance to which the license is bound for the associated purchase token from step 256. For example, for each license issued for a purchase token with respect to a hardware identifier binding, the license service database may associate the hardware identifier of the binding with the purchase token. If the license is bound to a USB key identifier or user authentication information, the corresponding information (e.g., USB key identifier or user authentication information) may be stored in the database and associated with the purchase token. If the license is bound to a TPM instance, a public key certificate for a TPM root of a trusted CA (certificate authority) may be stored. If the license is bound to a user authentication instance, the user's domain and user name or SID may be stored.

If step 258 evaluates to yes, control proceeds to step 260 to determine whether the current activation involves a license reissue. A determination can be made as to whether this is a license reissue by comparing the binding information in the BC, such as the hardware identifier, to information in the license database regarding existing issued licenses. In connection with hardware identifiers bound to an issued license, recall that as described herein, different levels or degrees of tolerance may be used in connection with making a determination as to whether two hardware identifiers match. For example, two hardware identifiers generated for the same computer system may not match exactly if there has been a hardware configuration change, such as a new hard drive installed, memory upgrade, and the like, depending on how the hardware identifiers are generated. Different techniques as described elsewhere herein may be used to determine whether two hardware identifiers are substantially the same and thus identify the same computer system to constitute a license reissuance. If step 260 determines that this is a license reissue, control proceeds to step 266 to reissue a license. In connection with reissuance, a new license may be generated based on the current information of the received EC and BC and the license database accordingly updated. With a reissue, the net number of allocated license does not change. If step 260 evaluates to no, control proceeds to step 262 to determine whether the number of allowed licenses has already been reached so that issuing another new license would then exceed the maximum allowable number of activations. If step 262 evaluates to no, control proceeds to step 266 to issue a new license and record the license information in the license service database as described in connection with other processing steps of 250. If step 262 evaluates to yes, control proceeds to step 264 and a new license is not issued.

With respect to the flowchart 250 processing performed by the license service, possible outcomes are reissuing a license, issuing a new license, or failure to issue a license. The failure may be due to exceeding a number of allowed licenses or other condition, such as a verification failure.

It should be noted that any encrypted entitlements in the EC may also be decrypted by the LS using the public key of the LS. The decrypted entitlements may be used in connection with license issuance.

In one embodiment, a license may be a digital certificate including the EC and BC. The license may be signed with the private key of the LS 120. The license received from the LS 120 may be stored on the computer 102 for subsequent use in connection with launching the software for which the license has been issued.

As described herein, the ES 104 generates entitlements included in the EC that may be consumed by the computer 102 and the LS 120 depending on the particular entitlement. The entitlements include specification of license characteristics which are then used by the LS 120 and the computer 102 in enforcing the license terms and conditions as expressed therein. The foregoing license conditions or terms are enforced by the LS 120 as part of the license issuing process performed by the LS 120. The license conditions or terms are then also enforced by the computer system 102 each time the software associated with the license (e.g., having the purchase token and package information) is launched or invoked.

What will now be described is processing that may be performed by the computer 102 each time the software for which a license has been issued is invoked. The following description is made with respect to a license binding type of hardware identifier although other binding types may be used. It will be appreciated by those skilled in the art that the steps of 280 may be adapted for use with the different binding types utilized in an embodiment.

Referring to FIG. 6, shown is a flowchart of processing steps that may be performed on a device, such as the computer 102, each time software installed thereon is launched or invoked for execution. Processing steps of 280 determine if execution of the software on the computer is in accordance with a valid license previously generated using the online activation processing. Prior to executing steps of flowchart 280, a license may be located on the device. In one embodiment, the license may be stored in a particular location, such as a directory, file, and the like. If no license is found in the expected location, the software launch is terminated. Processing of 280 proceeds after a license is determined to be on the computer 102.

At step 282, the license signature is verified using the public key of the LS as described elsewhere herein, for example, in connection with verification of the EC 108 which is digitally signed by the ES 104 and received by the computer 102. At step 284, the computer 102 generates a new hardware identifier based on the current hardware configuration of the computer system 102. At step 286, the generated hardware identifier from step 284 is compared to the hardware identifier in the BC to ensure that the two are considered a match. As described elsewhere herein, such a determination may be made with respect to an acceptable tolerance or degree of difference so that a determination is made as to whether the two hardware identifiers are substantially the same identifying the same computer. Unsuccessful verification of step 286 may indicate that the license was issued for a computer different than the computer upon which the software launch is currently being attempted and the software is not allowed to execute. The execution may terminate with an error message regarding the failure and to suggest contacting a vendor or supplier of the software for assistance. At step 288, verification processing is performed to ensure that the purchase token of the EC matches the purchase token as stored from the previous activation process. At step 290, processing may be performed in accordance with entitlements in the EC appropriate for launch verification. Step 290 may include performing processing in accordance with one or more entitlements and taking an action in response such as entering a dialogue with a user or other actions. For example, step 290 processing may use date information expressed in the entitlements to determine if a license has expired, is being launched in accordance with a specified starting date, and the like. If the license has expired, the user may be prompted with a dialogue inquiring whether the user wants to renew the license. If the user indicates via a user input or selection that he/she wants to renew, the computer 102 may be connected to a website to begin the renewal process. If the license is based on a number of uses, such as 1000 invocations after which the license expires, a message may be displayed upon each invocation indicating the current use number and the number of remaining invocations. If the license has a license expiration data, a message may be displayed to the user to indicate that license will expire in MM days if the current date is within a predefined time period from the license expiration date. Information regarding the license may be recorded on the user computer 102 and used in connection with subsequent invocations. Such information may be stored in a known location in a directory, file, registry setting, and the like, on the computer 102. Such information may include, for example, the current number of invocations or uses for a particular software application.

If verification process of steps 286, 288, and/or 290 is unsuccessful, the current attempt to execute the software fails and may terminate with an appropriate message, further instructions, and the like.

As described herein, different binding types besides the hardware identifier may be used in an embodiment. If the binding type is TPM, steps 284 and 286 may be replaced with processing related to the TPM instance. As described elsewhere herein for a TPM, the BC may include a random number which is both encrypted and also in an unencrypted form, such as readable text. The encrypted random number has been encrypted using a public key of the TPM. For each program launch, the computer 102 may decrypt the encrypted random number using the private key of the TPM and compare the decrypted result to the unencrypted random number included in the BC. If the two decrypted random number matches the unencrypted random number of the BC, then the license was issued for the TPM included on the computer 102, step 286 verification processing is successful, and the launched software is allowed to execute. Otherwise, step 286 using the TPM binding instance fails. If the binding type is USB identifier, then step 284 obtains the USB identifier of the current USB device plugged into the computer upon which execution is being attempted. At step 286, the current USB identifier is compared to the USB identifier of the license as included in the BC. If the two match, then the license was issued for the USB identifier of the device currently plugged into the computer 102. Otherwise, step 286 using the USB identifier instance fails. If the binding type is user authentication information, step 284 obtains the current user authentication information for the user currently logged into the computer upon which execution is being attempted. At step 286, the current user authentication information is compared to the user authentication information of the license as included in the BC. If the two match, then the license was issued for the current user authentication information. Otherwise, step 286 fails.

The foregoing describes processing for an online activation mode when the computer 102 has computer connectivity to the one or more servers including the various services. As an alternative, activation processing in one embodiment may be performed using an offline activation mode.

Figure 6A:
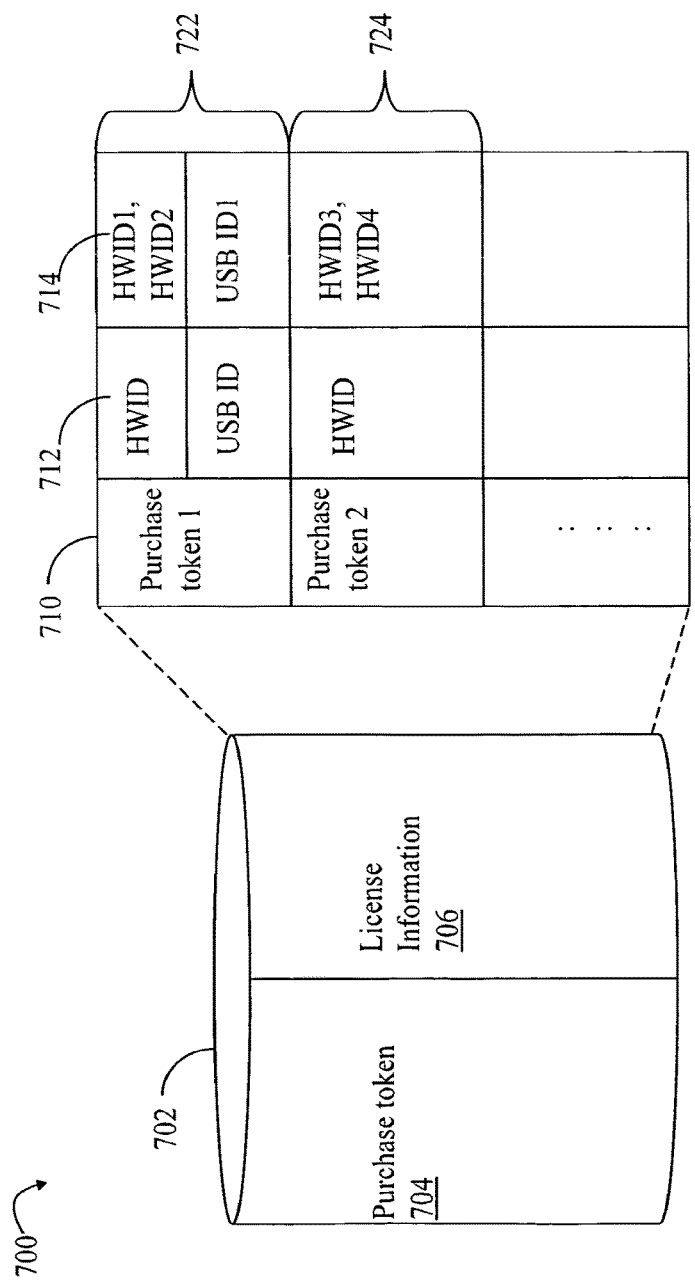
FIG. 6A is an example representation of a license database.

Referring to FIG. 6A, shown is an example representation of a license database. The example 700 illustrates information as may be included in the license database of the LS 120 of FIG. 3. The license database 702 may be logically organized so that for a given purchase token 704, corresponding license information 706 may be retrieved. The license information 706 identifies the licenses issued for a given purchase token. The example 700 illustrates in further detail how the license database 702 may be logically organized and also includes examples of license information 706. The purchase tokens are included in column 710. The database 702 may include one or more records of information for a given purchase token. The license information is described in columns 712 and 714. In this example, more than one type of binding may be allowed for each purchase token so the different binding types for a given purchase token are indicated in column 712. Column 714 includes the binding instances for which licenses have been generated. Element 722 identifies licensing information in the licensing database for first purchase token "Purchase token 1". Licenses for Purchase token 1 have been issued for two binding types—hardware identifier (HDWID) and USB identifier (USB ID)—as indicated in 712. Two licenses have been issued for Purchase token 1. Each license is bound to one of the hardware identifier binding type instances HWDID1 and HWDID2. One license has been issued for Purchase token 1 which is bound to the USB identifier binding type instance USBID1. Licenses for Purchase token 2 are included in 724. Licenses have been issued for the hardware identifier (HDWID) binding type as indicated in 712. Two licenses have been issued for Purchase token 2. Each license is bound to one of the hardware identifier binding type instances HWDID3 and HWDID4 of column 714.

It will be appreciated by those skilled in the art that the example 700 presents only one possible representation and organization of the license database that may be used in an embodiment. Additionally, other information than as included in the example 700 may also be included in the license database and may vary with possible binding types.

Figure 7:
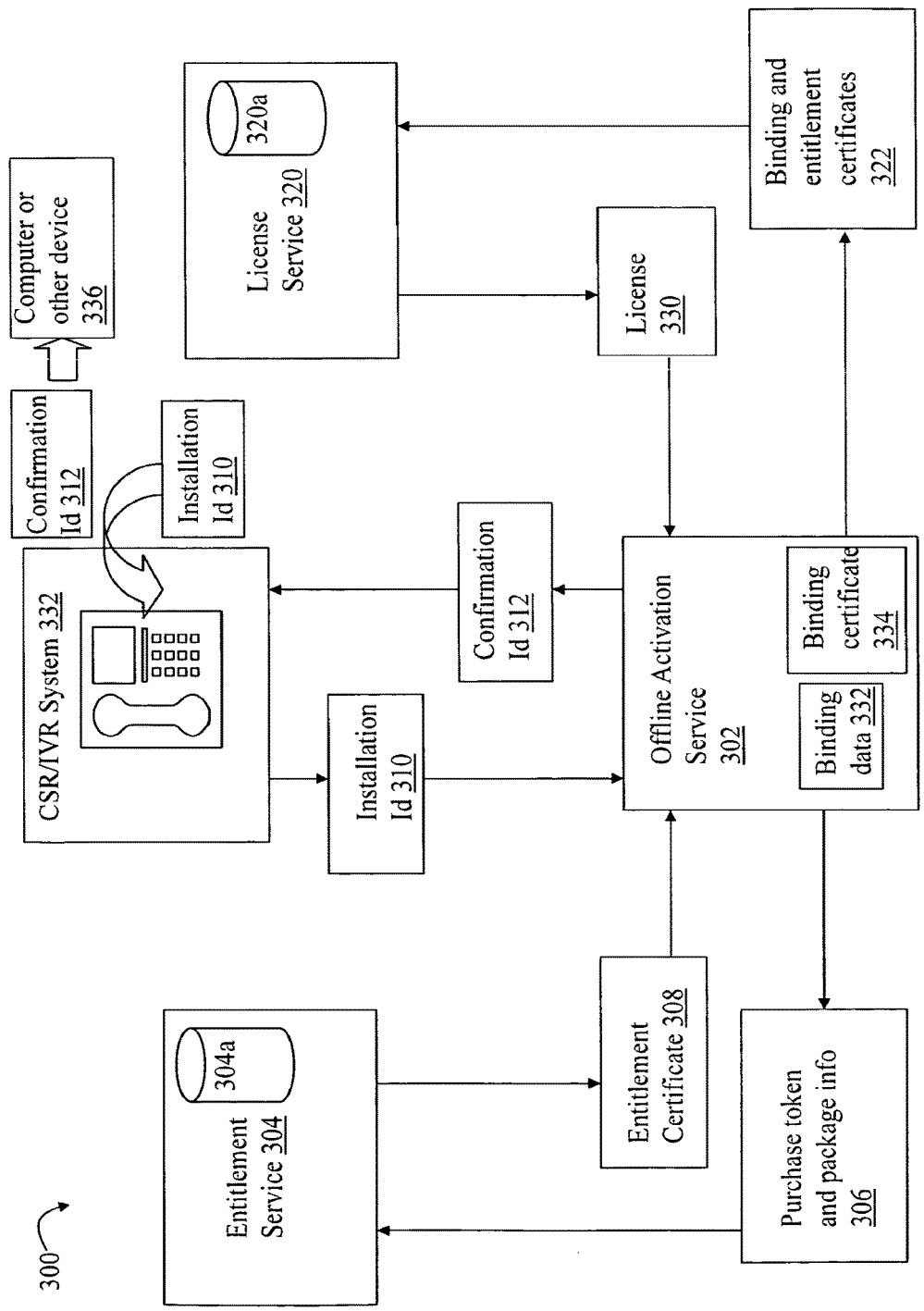
FIG. 7 is an example of an embodiment of components that may be used in connection with offline activation processing.

Referring to FIG. 7, shown is an example illustrating the offline activation processing that may be performed using techniques herein. The example 300 includes an offline activation service (OAS) 302 and a CSR/IVR system 332. In connection with the offline activation mode, only the hardware identification type binding may be supported. As with the online activation mode, the software being activated is installed on a device 336. In this example, the device 336 may be a computer which does not have connectivity to the server(s) providing the services as described in connection with the online activation mode. The user performing the activation process may initially contact the CSR/IVR system 332 and provide an installation identifier 310. The installation identifier may include one or more components and may be generated by the device 336 as part of the installation process. As part of the installation process, the user may be asked whether he/she wants to activate using the online or offline activation mode. If the offline mode is selected, the user may be provided with an installation identifier. In one embodiment, the installation identifier may be formed from a hardware identifier for the device 336, the package information for the software installed for which activation is being performed, and the purchase token for the software. Software on the device 336 may be executed to form the hardware identifier. The purchase token and package information may be entered as part of the installation dialogue. The purchase token, package information, and hardware identifier may be stored on the device 336 for use in connection with verification processing when subsequently launching the program for which activation is being performed.

Figure 8:
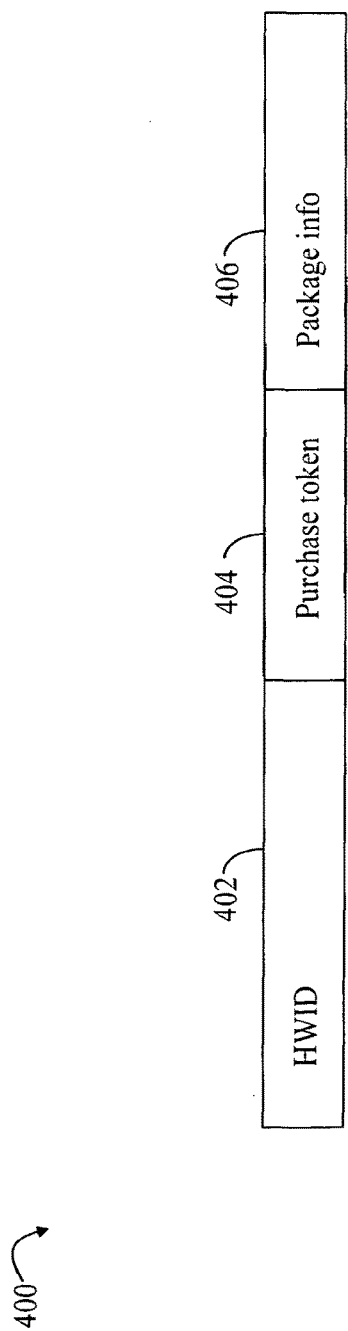
FIG. 8 is an example of an installation identifier.

FIG. 8 shows an example representation of an installation identifier that may be used in an embodiment. The installation identifier of the example 400 may be formed by concatenating the hardware identifier (HWDID) 402 with the package information 406 and purchase token 404 for the software for which activation is being performed. The hardware identifier 402 may be any one of a variety of different hardware identifiers identifying the hardware of the device 336. In one embodiment, the hardware identifier may be a compact hardware identifier (CHWID) as described in U.S. Publication No. 2004/0177354. The CHWID may be formed from a larger, more verbose, hardware identifier (VHWID). The VHWID may be formed from a set of "n" hardware classes. Each class may identify a class of hardware components such as, for example, a hard drive, network card, CPU, and the like, as described elsewhere herein. For each class, a first hash value may be formed for each component class based on the particular components of each class for the device 336. For example, an identification string may be formed based on the particular hard drive or CPU in a computer. The string may identify the manufacturer and other information unique to the computer's CPU or hard drive (e.g., "INTEL 989709789798"). A first hash value may be formed for the string identifier. The resulting first hash values for each of the "n" components classes may be concatenated to form the VHWID. The CHWID may be formed by identifying a subset "q" of the "n" classes used for the VHWID. A second hash function may be applied to each of the first hash values for those selected "q" classes to generate "q" second hash values. The "q" second hash values may then be concatenated and used as the CHWID. In connection with performing the hashing for both the first and second hash values, any one of a variety of hashing functions may be used such as, for example, SHA-1, MD5, and the like. Both the VHWID and the CHWID may be formed using code executed on the device 336. The resulting CHWID, or VHWID from which the CHWID is formed, may be stored on the device 336 for later use in connection with performing verification processing when launching the software for which activation is being performed. The CHWID may be used as the hardware identifier component 402 used in forming the installation identifier although other techniques may be used to generate 402.

The installation identifier 310 may be a string of alphanumeric characters encoded as decimal digits which are entered over the phone or otherwise communicated to CSR/IVR System 332. In one embodiment, the installation identifier may be 128 bits although other sizes may be used. The size of the installation identifier may vary with each embodiment and the size of each of the components (e.g., hardware identifier, purchase token, and package information) used in forming the installation identifier. The system 332 then provides the installation identifier 310 to the OAS 302. The OAS may be a computer system connected to the CSR/IVR 332. Code executing on the OAS 302 may parse the installation identifier 310 to extract the purchase token and package information 306 therefrom.

Figure 9:
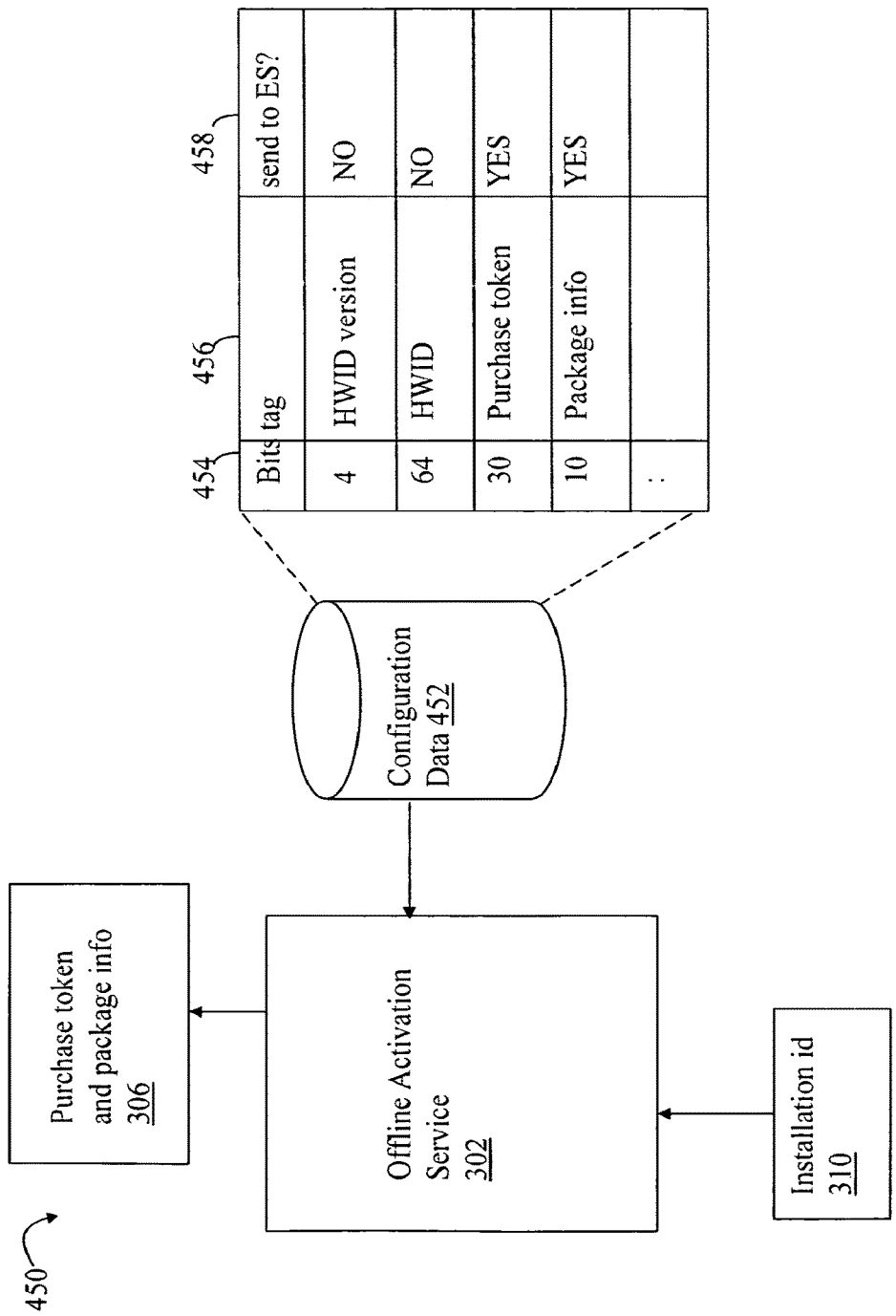
FIG. 9 is an example illustrating how the Offline Activation Service (OAS) parses an installation identifier.

FIG. 9 illustrates how the OAS 302 may parse the installation identifier 310 in accordance with configuration data 452. The configuration data 452 may indicate the various fields of the layout or data format of the installation identifier as illustrated in FIG. 8. The configuration data 452 may indicate which fields of the installation identifier are extracted to obtain the purchase token and package information. The configuration data may indicate the appropriate number of bits to extract as well as the starting or offset bit position for the extraction. In one embodiment, the configuration data file 452 may include a record for each field of the layout of the installation identifier. Each record may indicate a number of bits 454, a tag 456, and an indicator 458. The number of bits 454 may indicate the size in bits of the field. The tag 456 may be a text string identifying the particular field. The indicator 458 may be a flag indicating whether to extract the field for transmission to the ES.

Referring back to FIG. 7, the OAS 302 extracts the purchase token and package information 306 and sends the information 306 to the ES 304. The ES 304 generates a digitally signed EC 308 as described elsewhere herein in connection with the online activation mode. The EC 308 is sent to the OAS 302 which verifies the EC 308 using the public key of the ES 304. The OAS 302 then generates a BC 334 using its own private key and the hardware identifier included in a portion of the installation identifier. The BC 334 includes the hardware identifier and is digitally signed using the private key of the OAS 302. The OAS 302 sends the BC and EC 322 to the LS 320 to obtain a license 330. The LS 320 performs processing as described elsewhere herein in connection with the online activation mode for hardware identifiers. The possible outcomes of LS 320 processing are described above and may include generating a license 330 which is then sent to the OAS 302. As described elsewhere herein in connection with the online activation mode, the license 330 may contain the BC and EC. The license may be digitally signed using the private key of the LS 320. The OAS 302 performs processing to determine if it received a valid license from the LS 320.

Figure 10:
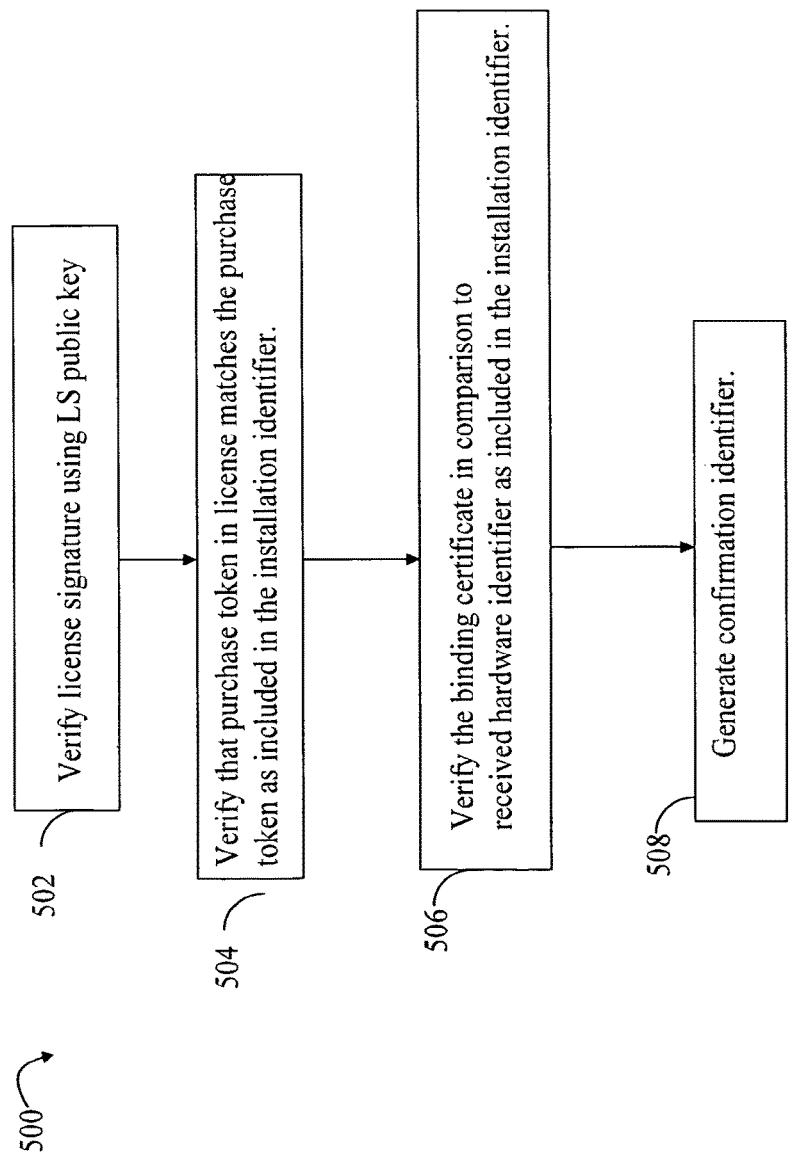
FIG. 10 is a flowchart of processing steps that may be performed by the OAS in connection with generating the confirmation identifier.

Referring to FIG. 10, shown is a flowchart of processing steps that may be performed in an embodiment by the OAS 302 in processing a received license 330. At step 502, license signature may be verified. The license may be signed with the private key of the LS. Similar to as described elsewhere herein in connection with other digital signatures generated using a private key, a corresponding public key may be used to verify the digital signature. A step 502, the LS public key is used in verification. At step 504, verification processing may be performed to determine whether the purchase token of the license matches the purchase token as included in the installation identifier. At step 506, verification processing of the BC may be performed. Step 506 may include comparing the hardware identifier of the BC to the hardware identifier as included in the installation identifier. At step 508, the confirmation identifier may be generated if all previous verification processing of steps 502, 504 and 506 has completed successfully.

Figure 11:
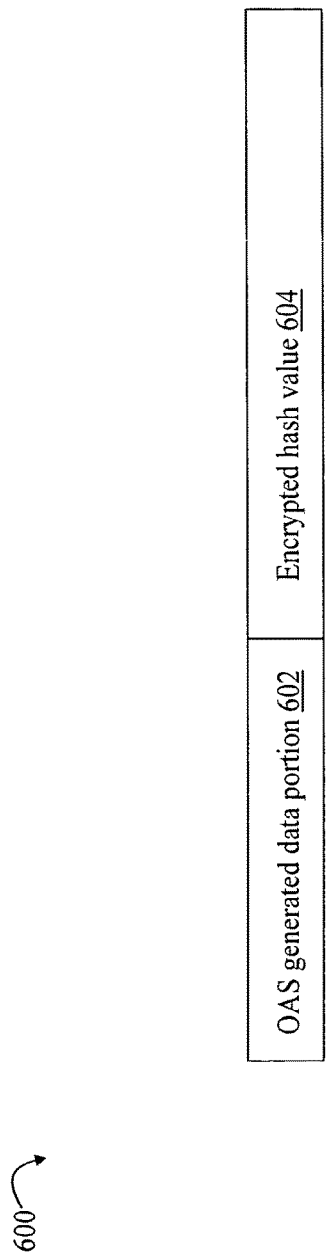
FIG. 11 is an example of a confirmation identifier.

Referring to FIG. 11, shown is an example representation of fields of a confirmation identifier. The confirmation identifier 600 includes an OAS generated data portion 602 and an encrypted hash value 604. The portion 602 may be generated by the OAS and based on the various entitlements included in the EC. The portion 602 may be characterized as a representation of the various licensing terms and conditions of the license. As part of generating the confirmation identifier, the OAS retrieves the entitlements of the EC and accordingly forms the portion 602. In one embodiment, the portion 602 may be 30 bits in size encoding various entitlements of the EC. For example, the portion 602 may include 3 bits representing the type of license, 7 bits representing the license expiration date, 7 bits representing a license start date, and the like. The size of the confirmation identifier may vary with embodiment. For example, an embodiment may use a confirmation identifier which is 114 bits having a field 604 which is 83 bits and a field 602 which is 31 bits.

The confirmation identifier in the example 600 also includes an encrypted hash value 604. Any one of a variety of different techniques may be used in connection with generating the hash value 604. For example, in one embodiment, the hash value 604 may be formed using the installation identifier and the data portion 602. The installation identifier and data portion 602 may have a hashing algorithm applied to generate a hash value. The hashing technique may be any one of a variety of different ones known in the art and as described elsewhere herein. The hash value may then be encrypted using any one of a variety of different techniques and stored as the hash value 604. In one embodiment, the hash value may be encrypted using the private key of the OAS which is then decrypted later on by the device 336 in connection with subsequent program launches and associated verification processing. As another example, the hash value may be encrypted using the encryption technique described in U.S. Pat. No. 7,020,776, Lauter et al, CRYPTOSYSTEM BASED ON A JACOBIAN OF A CURVE, Mar. 28, 2006.

Other data may be used in forming the confirmation identifier besides the portion 602 and installation identifier. The data from which the hash value 604 is produced may be indicated in the entitlements of the EC. For example, the EC may indicate portions of 602 and/or portions of the installation identifier, as well as other values, from which hash value 604 is generated. The EC may indicate, for example, the number of days for which to issue a license, a number of machines allowed to be activated for a particular license, and the like. Other examples of information that may be communicated in the EC are described elsewhere herein.

Once the confirmation identifier 312 is formed by the OAS 312, the OAS 312 communicates the confirmation identifier 312 to the CSR/IVR system 332. The system 332 communicates the confirmation identifier 312 to the user. The user may then enter the confirmation identifier 312, such as with an input device, on the device 336. The confirmation identifier 312 may be stored on the device 336 for use in connection with subsequent program launches. The installation identifier 310 may also be stored on the device 336 for use in connection with subsequent program launches. In one embodiment, the installation identifier 310 and the confirmation identifier 336 may be concatenated and stored as a single data item on the device 336.

As described above, the license generated from the online activation mode may be used with program launch in performing verification processing to determine whether to allow the program execution to proceed. As will be described in more detail below, the confirmation identifier generated from the offline activation mode may also be used in performing verification processing to determine whether to allow the program execution to proceed.

Figure 12:
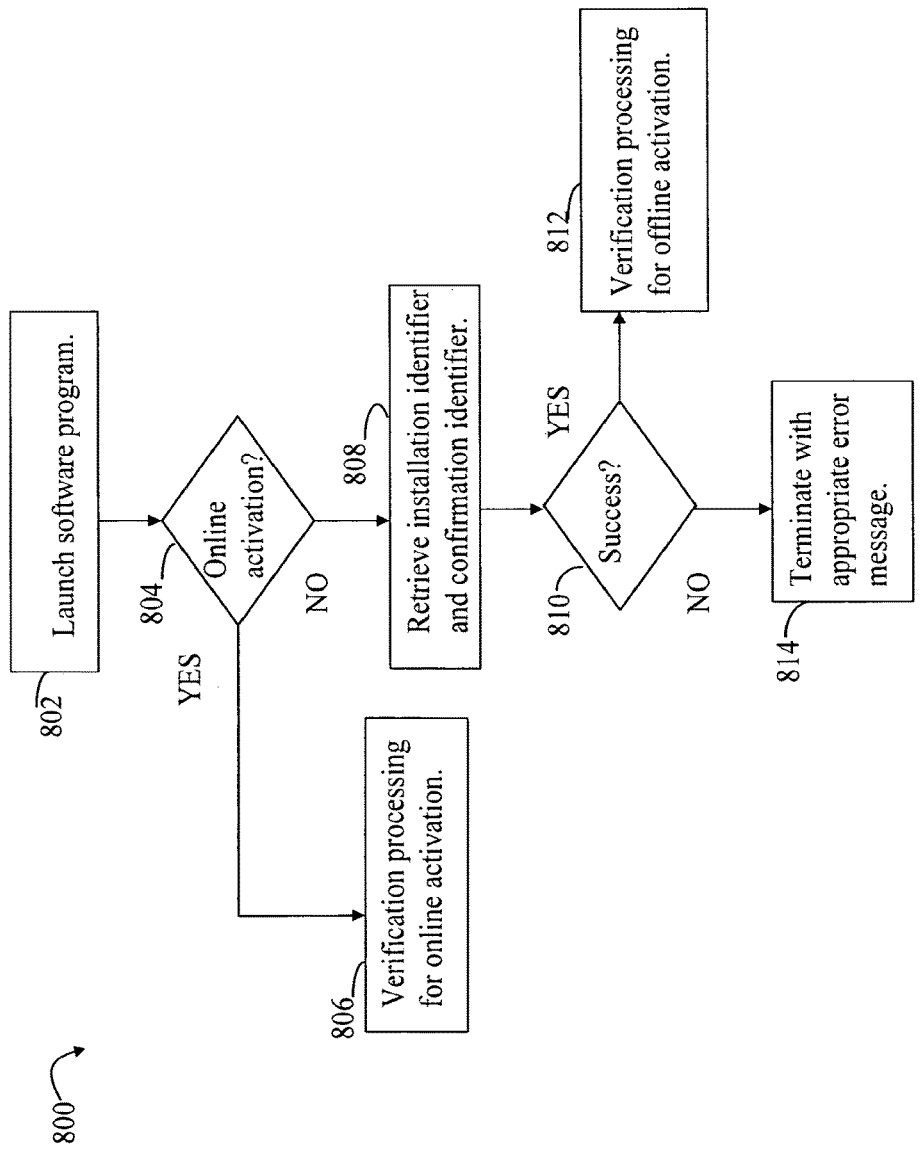
FIG. 12 is a flowchart of processing steps that may be performed in connection with launching software on a device.

Referring to FIG. 12, shown is a flowchart of processing steps that may be performed in an embodiment of a device, such as a computer, when attempting to execute software on the device. The software may be installed on the computer and either the online or offline activation processing performed to generate, respectively, a license or confirmation identifier. At step 802, the software program is launched or invoked. At step 804, a determination is made as to whether online activation has previously been performed. The computer may make the determination by examining the contents of a location on the computer which is expected to contain the license if online activation had been successfully performed. For example, the license may be stored in a particular directory, file, and the like. If the license is in the expected location, step 804 may evaluate to yes and control proceeds to step 806 to perform verification processing associated with program launching for online activation as described elsewhere herein. For example, such processing is described in connection with FIG. 6. If step 804 evaluates to no, control proceeds to step 808 where the installation identifier and confirmation identifier may be retrieved. The installation identifier and confirmation identifier may be stored in a known location similar to that as described with the license. If the installation and confirmation identifiers are located, step 810 evaluates to yes and control proceeds to step 812 to perform verification processing associated with program launching for offline activation as described in more detail in following paragraphs. Otherwise, step 810 evaluates to no and control proceeds to step 814 to terminate processing with the appropriate error message. The program is not allowed to execute in connection with step 814.

Referring to FIG. 13, shown is a flowchart of processing steps that may be performed in an embodiment in connection with execution of installed software on a device, such as a computer. The flowchart 900 illustrates processing that may be performed in connection with step 812 of FIG. 800 when information on the computer system is located which is associated with having previously performed offline activation processing. It should be noted that if any of the verification processing of step 904, 906, 908, or 912 fails, the software is not allowed to execute and processing may terminate with an appropriate message. At step 902, a current hardware identifier based on the hardware of the computer upon which the software launch is performed in step 802. The same technique used to generate the hardware identifier previously included in the installation identifier is used. At step 904, verification processing is performed to ensure that the current hardware identifier of step 902 matches the hardware identifier of the stored installation identifier. As described elsewhere herein, different techniques may be used to determine whether the two hardware identifiers are substantially the same to indicate the same computer system. For example, if the hardware identifier is the CHWID as described elsewhere herein, the CHWID may be formed as a concatenated set of hash values in which each hash value corresponds to a particular hardware component class. The hash values vary with the particular hardware for each class as included in the configuration of the computer system. A tolerance level may be introduced by having a threshold number of hash value matches between the current hardware identifier and the hardware identifier of the installation identifier. The threshold value may be some number, m, ≤q, the number of hash values and corresponding classes of the CHWID. The number selected for m may vary with an acceptable level of tolerance or variation in configuration of a computer system. At step 906, verification processing is performed to ensure that the stored purchase token and package information as previously entered during installation matches those of the stored installation identifier. At step 908, verification processing may be performed for the encrypted hash value of the confirmation identifier using the encrypted hash value portion 604. A decrypted hash value is generated for 604 using the public key of the OAS as stored on the computer. The public key may be stored, for example, as part of a previous installation of the software. The computer may perform processing as described elsewhere herein to generate a new hash value based on the stored installation identifier and data portion of the stored confirmation identifier. The new hash value is generated using the same technique as used by the OAS to generate portion 604. If the decrypted hash value matches the new hash value, then verification processing is successful. Otherwise, verification processing of step 908 fails. At step 910, the data portion 602 of the confirmation identifier stored on the computer may be extracted and decoded to determine the license characteristics. As described elsewhere herein, different entitlements describing license characteristics, such as license type, expiration date, and the like, may be encoded in the data portion of the confirmation identifier. The decoding of step 910 determines the license characteristics. Control then proceeds to step 912 where the license characteristics are used in connection with verification processing to ensure that a valid license exists. In connection with offline processing, the confirmation identifier is used rather than the license as in connection with online processing. The confirmation identifier is a different representation of the license characteristics. Step 912 processing may include, for example, determining the license expiration date and start date from the appropriate bits of the data portion 602 of the confirmation identifier. The current date is compared to both the start date and expiration date to determine if the software may be executed in accordance with the license characteristics.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
a trusted microchip having a private key;
at least one processing device; and
at least one hardware computer-readable storage media comprising executable instructions that, when executed by the at least one processing device, cause the at least one processing device to:
obtain an entitlement certificate from an entitlement service server, the entitlement certificate including one or more entitlements describing license characteristics of a license for software, the entitlement certificate having a digital signature generated by the entitlement service server with an entitlement service private key;
verify the digital signature of the entitlement certificate using an entitlement service public key corresponding to the entitlement service private key;
after the digital signature of the entitlement certificate has been verified, send the entitlement certificate with the digital signature to a license service server other than the entitlement service server, the license service server generating the license based at least on the entitlement certificate, the license being signed using a license service private key other than the entitlement service private key;
receive the license from the license service server;
attempt verification of the license using a license service public key corresponding to the license service private key;
obtain encrypted binding data associated with the license and unencrypted binding data associated with the license;
provide the encrypted binding data to the trusted microchip and, in response, receive decrypted binding data from the trusted microchip;
perform a comparison of the decrypted binding data obtained from the trusted microchip to the unencrypted binding data associated with the license; and
prevent the software from executing on the computing device unless the verification of the license is successful and the comparison indicates that the decrypted binding data obtained from the trusted microchip matches the unencrypted binding data associated with the license, the trusted microchip being configured to:
  use the private key to decrypt the encrypted binding data to derive the decrypted binding data; and
  provide the decrypted binding data to the at least one processing device.

2. The computing device of claim 1, wherein the executable instructions, when executed by the at least one processing device, cause the at least one processing device to:
  obtain at least one of a purchase token or package information relating to the software;
  send the at least one of the purchase token or the package information to the entitlement service server; and
  receive the entitlement certificate from the entitlement service server in response to the at least one of the purchase token or the package information.

3. The computing device of claim 1, wherein the executable instructions, when executed by the at least one processing device, cause the at least one processing device to:
  obtain a binding certificate from a binding service server, the binding service server being a different server than the entitlement service server and the license service server; and
  send the binding certificate to the license service server, the license service server generating the license based at least on the entitlement certificate and the binding certificate.

4. The computing device of claim 3, wherein the license includes the binding certificate and the encrypted binding data and the unencrypted binding data are obtained from the binding certificate included in the license.

5. The computing device of claim 1, wherein the executable instructions, when executed by the at least one processing device, cause the at least one processing device to:
  verify the digital signature of the entitlement certificate by comparing a locally-generated value to another value generated by the entitlement service server.

6. The computing device of claim 1, wherein the license is a digital certificate that includes the entitlement certificate.

7. The computing device of claim 6, wherein the entitlement certificate includes criteria for executing the software on the computing device.

8. The computing device of claim 7, wherein the executable instructions, when executed by the at least one processing device, cause the at least one processing device to:
  prevent the software from executing on the computing device unless the criteria are met.

9. The computing device of claim 1, wherein the trusted microchip is a trusted platform module.

10. The computing device of claim 1, wherein the trusted microchip is configured to prevent exposure of the private key outside of the trusted microchip.

11. A method performed by a computing device, the method comprising:
  by a processing device of the computing device:
    obtaining an entitlement certificate from an entitlement service server, the entitlement certificate including one or more entitlements describing license characteristics of a license for software and having a digital signature generated by the entitlement service server using an entitlement service private key;
    verifying the digital signature of the entitlement certificate using an entitlement service public key corresponding to the entitlement service private key;
    after the digital signature of the entitlement certificate has been verified, sending the entitlement certificate with the digital signature to a license service server other than the entitlement service server;
    obtaining a license from the license service server, the license being signed using a license service private key other than the entitlement service private key;
    obtaining encrypted binding data associated with the license and unencrypted binding data associated with the license; and
    providing the encrypted binding data to a trusted microchip of the computing device;
  by the trusted microchip, decrypting the encrypted binding data with a private key and outputting decrypted binding data to the processing device; and
  by the processing device:
    performing a comparison of the decrypted binding data obtained from the trusted microchip to the unencrypted binding data associated with the license;
    attempting verification of the license using a license service public key corresponding to the license service private key; and
    preventing the software from executing on the computing device unless the verification of the license is successful and the comparison indicates the decrypted binding data obtained from the trusted microchip matches the unencrypted binding data associated with the license.

12. The method of claim 11, further comprising:
  obtaining a public key certificate for the trusted microchip of the computing device;
  sending the public key certificate for the trusted microchip of the computing device to a binding service server other than the entitlement service server and the license service server;
  receiving an encrypted number from the binding service server;
  decrypting the encrypted number using the trusted microchip of the computing device to obtain a decrypted number;
  providing the decrypted number to the binding service server; and
  responsive to providing the decrypted number to the binding service server, receiving, from the binding service server, a binding certificate certifying an identity of the trusted microchip.

13. The method of claim 12, further comprising:
  sending the binding certificate certifying the identity of the trusted microchip to the license service server,
  wherein the license service server sends the license to the computing device responsive to receiving the binding certificate and the entitlement certificate.

14. The method of claim 13, wherein the license includes the binding certificate and the entitlement certificate, the binding certificate includes the encrypted number as the encrypted binding data, and the binding certificate includes an unencrypted form of the encrypted number as the unencrypted binding data.

15. A computing device comprising:
a processing device; and
a trusted microchip having a private key,
the processing device being configured to:
  obtain an entitlement certificate having a digital signature from an entitlement service server, the entitlement certificate indicating circumstances under which software may be executed on the computing device;
  verify the digital signature of the entitlement certificate using an entitlement service key;
  after verifying the digital signature of the entitlement certificate, send the entitlement certificate and the digital signature of the entitlement certificate to a license service server other than the entitlement service server;

obtain a license from the license service server, the license service server generating the license based at least on the entitlement certificate, the license identifying the circumstances under which software may be executed on the computing device;

obtain encrypted binding data associated with the license and unencrypted binding data associated with the license;

provide the encrypted binding data to the trusted microchip and, in response, receive decrypted binding data from the trusted microchip;

perform a comparison of the decrypted binding data obtained from the trusted microchip to the unencrypted binding data associated with the license; and enforce the license on the computing device by preventing the software from executing on the computing device unless the circumstances are met and the comparison indicates the decrypted binding data obtained from the trusted microchip matches the unencrypted binding data associated with the license, the trusted microchip being configured to use the private key to perform a decryption of the encrypted binding data and output the decrypted binding data to the processing device.

16. The computing device of claim 15, the circumstances indicated by the entitlement certificate comprising an expiration date of the license.

17. The computing device of claim 15, wherein the processing device is further configured to:

obtain the encrypted binding data and the unencrypted binding data from the license.

18. The computing device of claim 17, the unencrypted binding data comprising an unencrypted number and the encrypted binding data comprising an encrypted number obtained by encrypting the unencrypted number.

19. The computing device of claim 18, wherein the license includes a binding certificate certifying an identity of the trusted microchip.

20. The computing device of claim 19, wherein the binding certificate includes the unencrypted number and the encrypted number.

21. The computing device of claim 20, wherein the processing device is configured to:

prior to obtaining the license, obtain the binding certificate by:

receiving the encrypted number from a binding service server and providing the encrypted number to the trusted microchip, the trusted microchip decrypting the encrypted number with the private key to obtain the unencrypted number;

sending the unencrypted number to the binding service server; and receiving the binding certificate from the binding service server in response to sending the unencrypted number; and send the binding certificate to the license service server, the license service server including the binding certificate in the license.

22. The computing device of claim 15, wherein the processing device is further configured to:

verify a digital signature of the license using a public key of the license service server and prevent the software from executing on the computing device until the digital signature of the license is verified.

* * * * *